United States Patent [19]

Winstead

[11] 4,420,300

[45] Dec. 13, 1983

[54] CONTINUOUS ROTARY THERMO-FORMING SYSTEMS AND APPARATUS OF THE PRESSURE ASSIST, PLUG ASSIST AND MATCH MOLD TYPE

[75] Inventor: Thomas W. Winstead, Cockeysville, Md.

[73] Assignee: Maryland Cup Corporation, Owings Mills, Md.

[21] Appl. No.: 370,293

[22] Filed: Apr. 20, 1982

Related U.S. Application Data

[62] Division of Ser. No. 177,582, Aug. 13, 1980.

[51] Int. Cl.³ .................... B29C 17/04; B29C 17/10; B29D 7/02
[52] U.S. Cl. .................................. 425/142; 425/143; 425/149; 425/150; 425/308; 425/310; 425/326.1; 425/345; 425/350; 425/377; 425/388; 425/DIG. 60
[58] Field of Search .................... 425/143, 296, 302.1, 425/308, 310, 335, 345, 347, 348 R, 351, 350, 371, 363, 373, 377, 388, 405, DIG. 60, 142, 149, 150, 326.1

[56] References Cited

U.S. PATENT DOCUMENTS

| | | | |
|---|---|---|---|
| 2,949,639 | 8/1960 | Woodward | 264/280 |
| 3,071,812 | 1/1963 | Miller | 425/302.1 |
| 3,238,565 | 3/1966 | Jacobs | 425/308 |
| 3,329,306 | 7/1967 | Stein | 264/321 |
| 3,667,889 | 6/1972 | Martelli | 425/388 |
| 3,770,860 | 11/1973 | Amberg et al. | 264/89 |
| 4,061,706 | 12/1977 | Duffield et al. | 264/90 |
| 4,211,743 | 7/1980 | Nauta et al. | 425/363 |
| 4,235,579 | 11/1980 | Kurz et al. | 425/342.1 |
| 4,239,727 | 12/1980 | Myers et al. | 264/550 |
| 4,244,915 | 1/1981 | Boardman | |

FOREIGN PATENT DOCUMENTS

| | | |
|---|---|---|
| 1479459 | of 0000 | Fed. Rep. of Germany. |
| 1917902 | of 0000 | Fed. Rep. of Germany. |
| 7229980 | of 0000 | France. |

*Primary Examiner*—Willard E. Hoag
*Attorney, Agent, or Firm*—Birch, Stewart, Kolasch & Birch

[57] ABSTRACT

Apparatus for continuous thermoforming of sheet material including an extruder, stretching means, a rotary wheel having female mold means thereon and plural plug-assist means interlinked so as to form an orbiting device having the plug-assist members engaging the sheet material about a substantial arc of wheel surface and means to reciprocate the plug assist members into and out of engagement with the female mold means.

23 Claims, 25 Drawing Figures

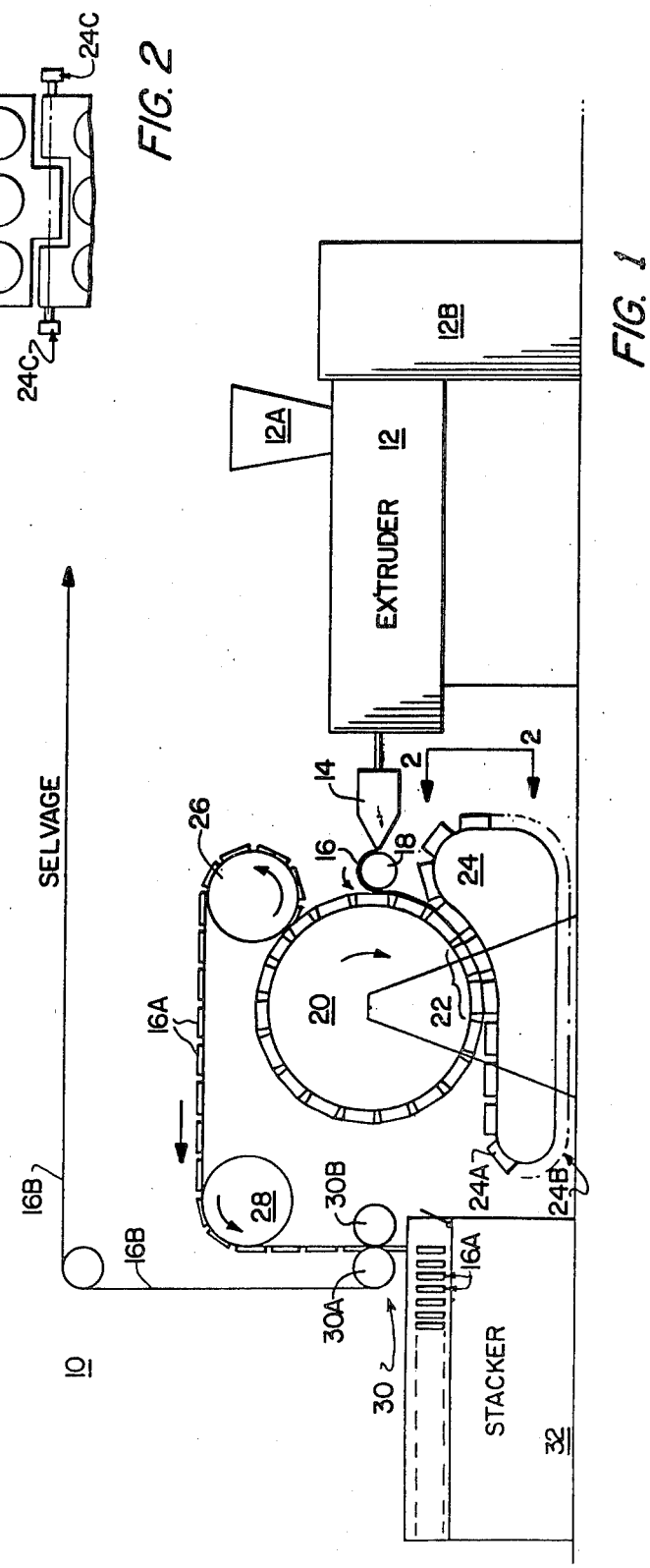

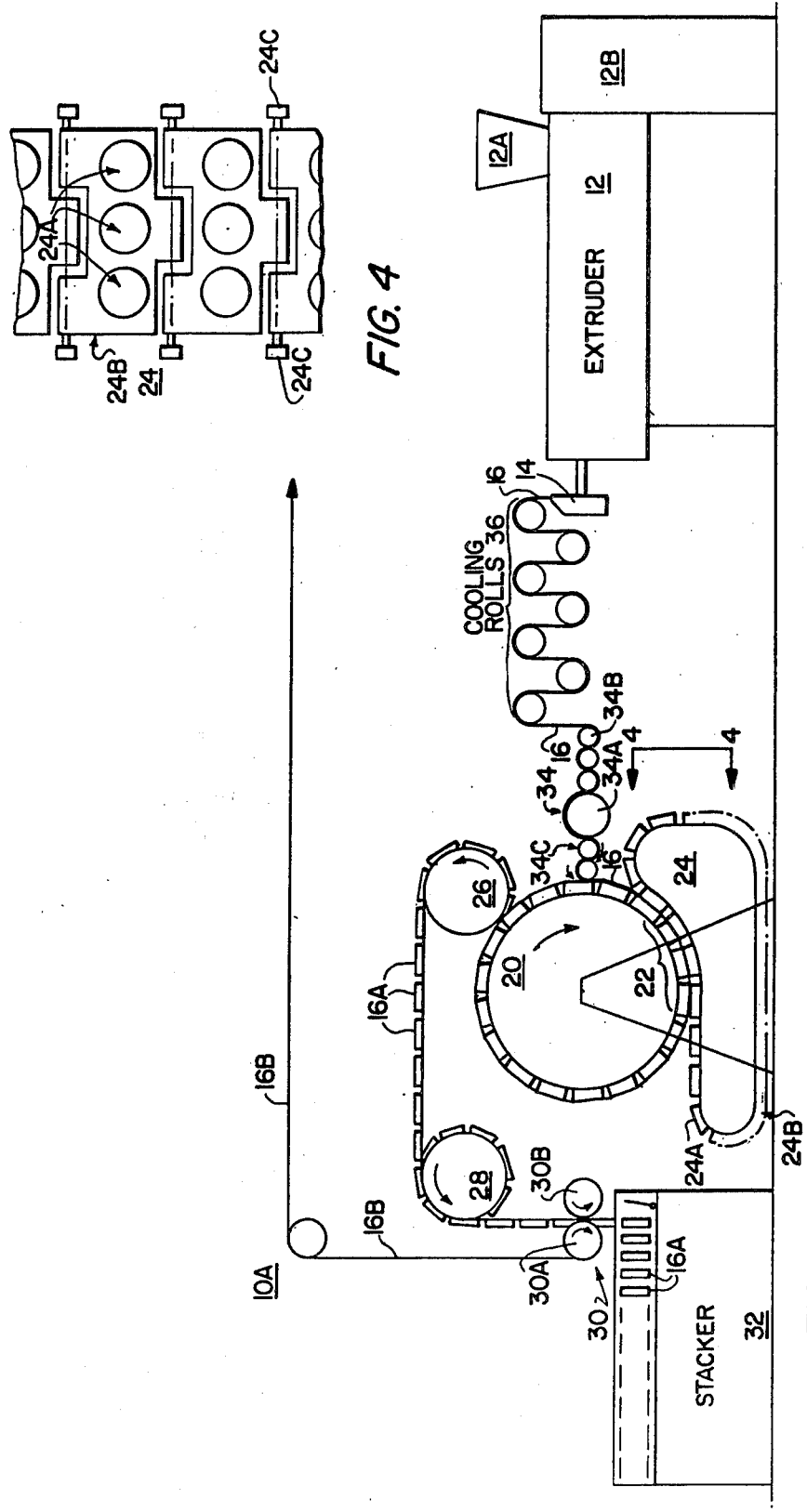

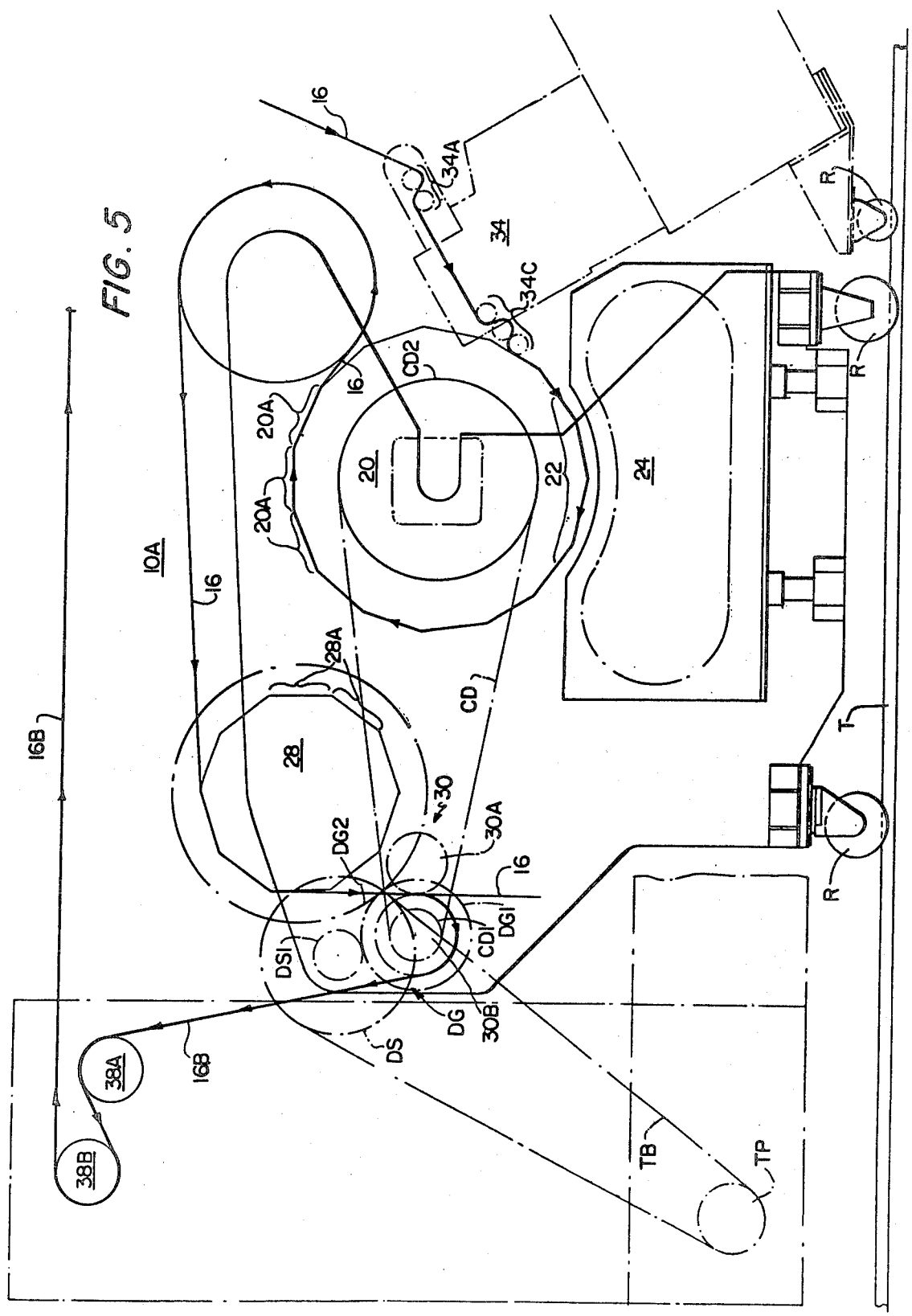

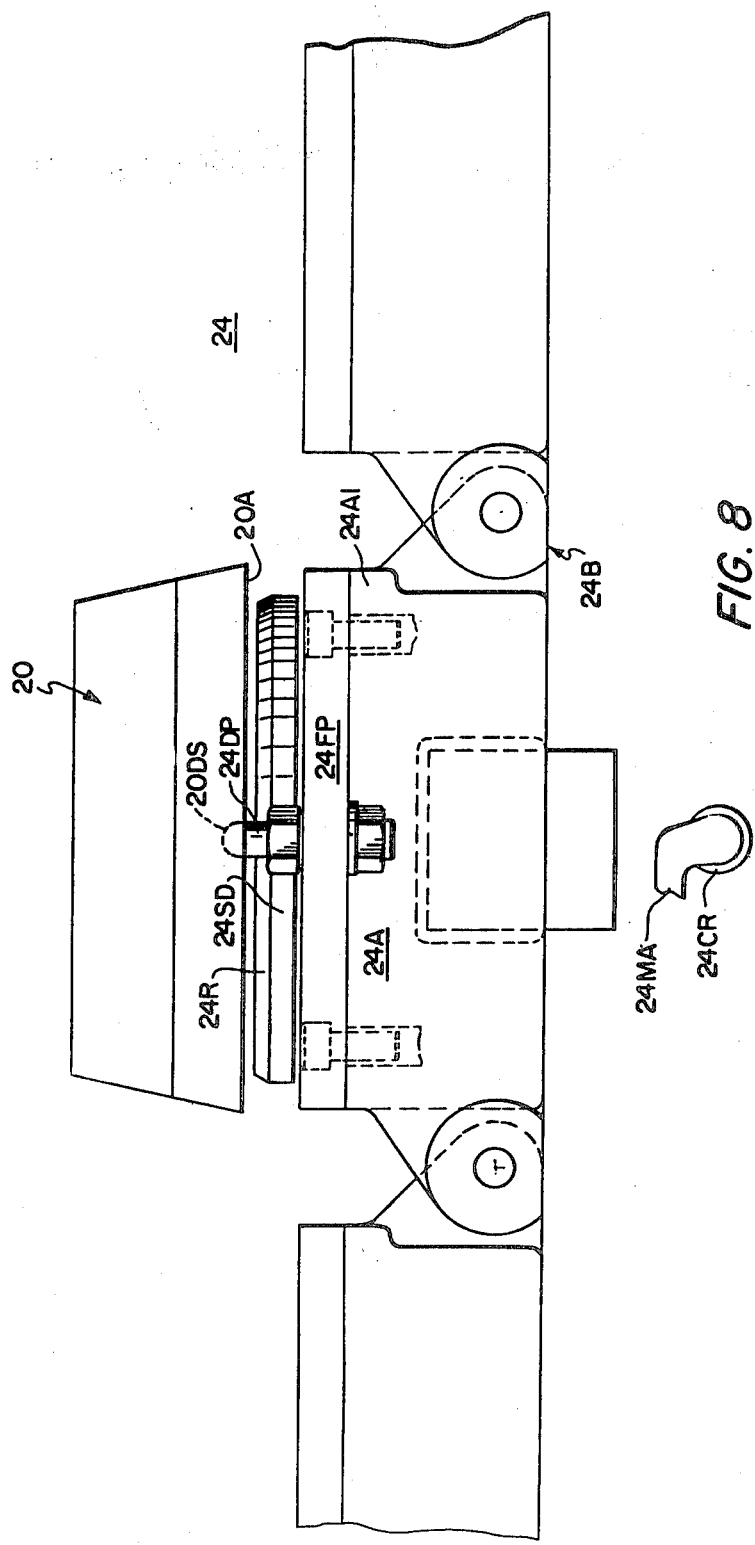

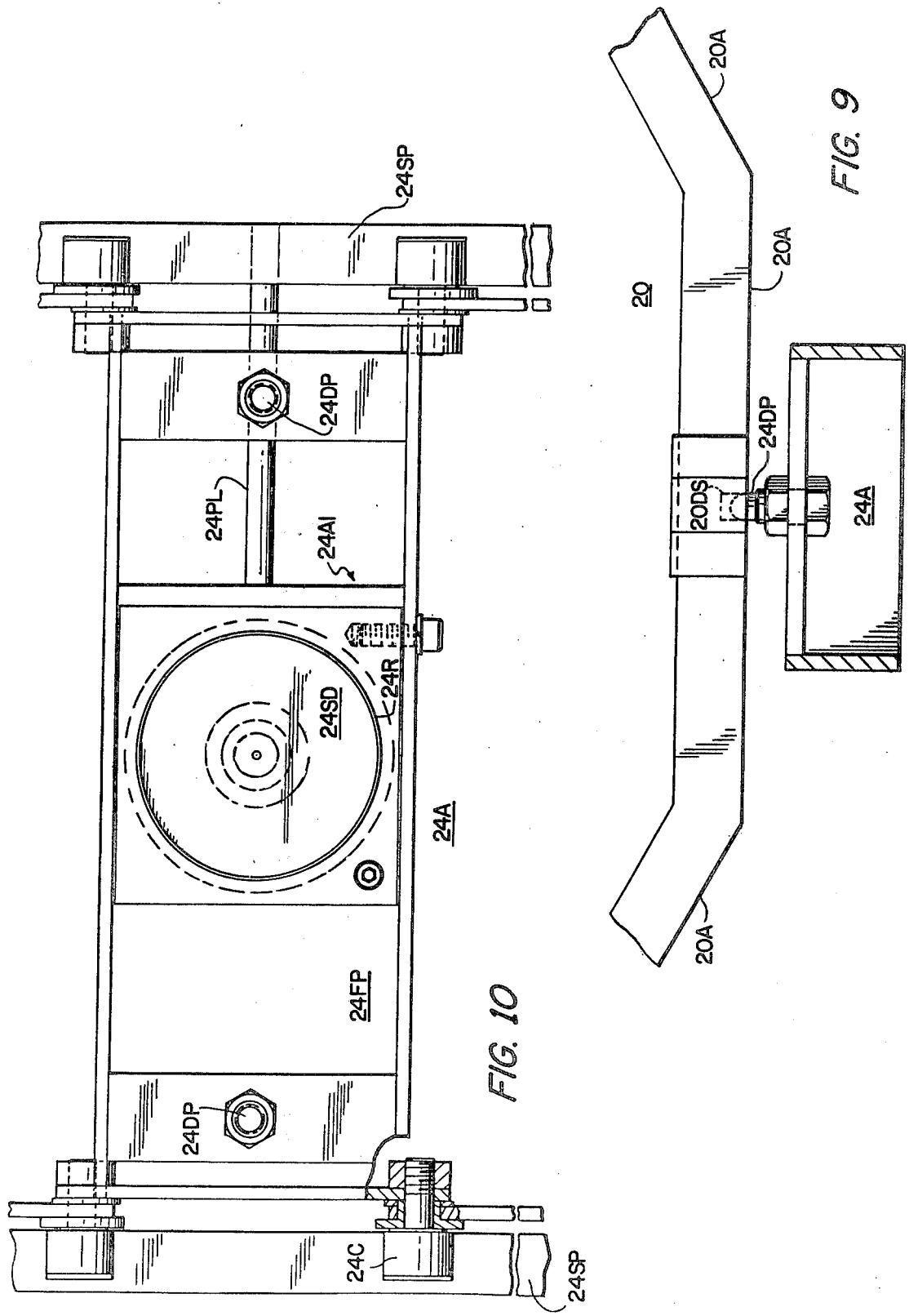

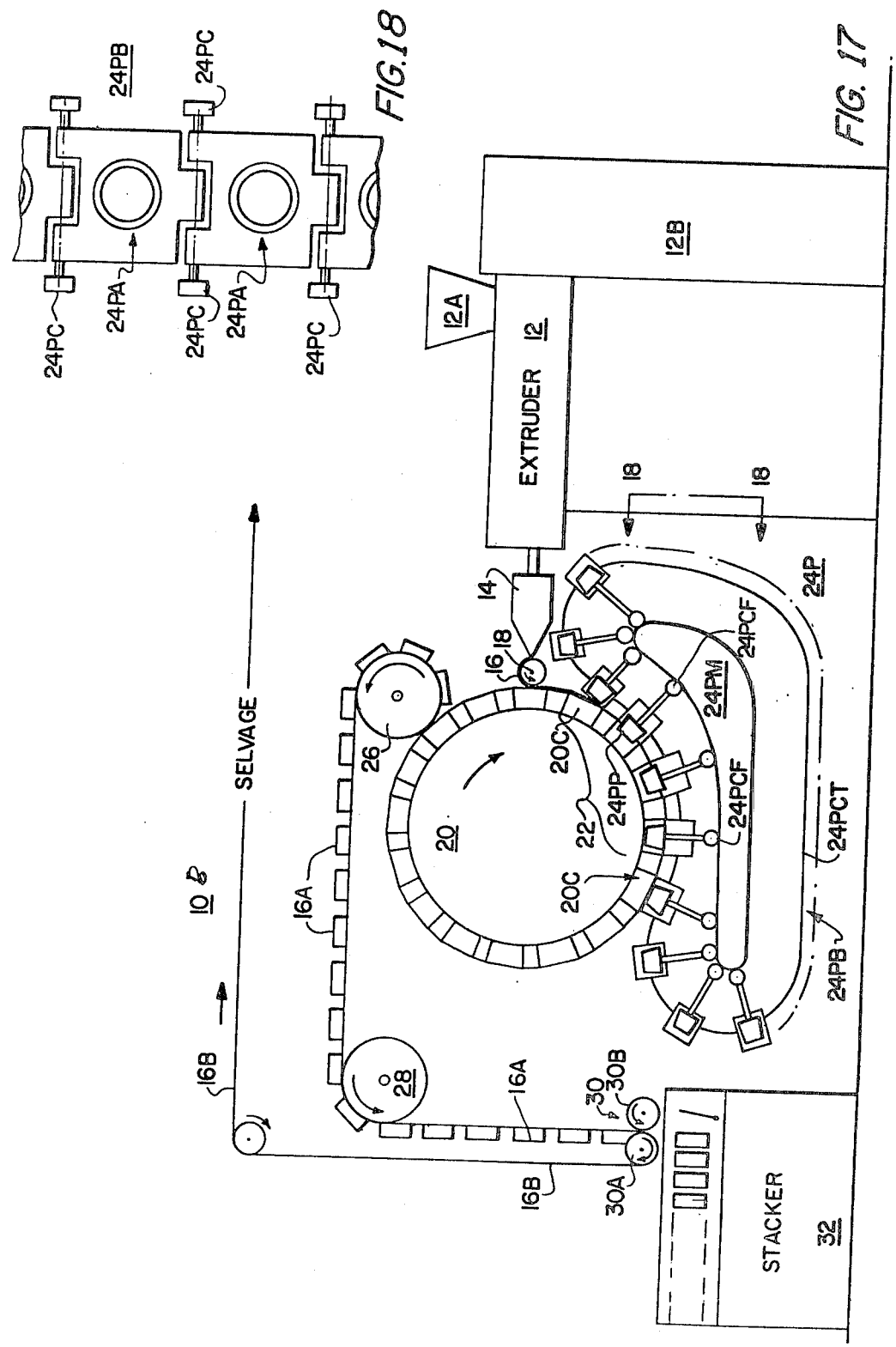

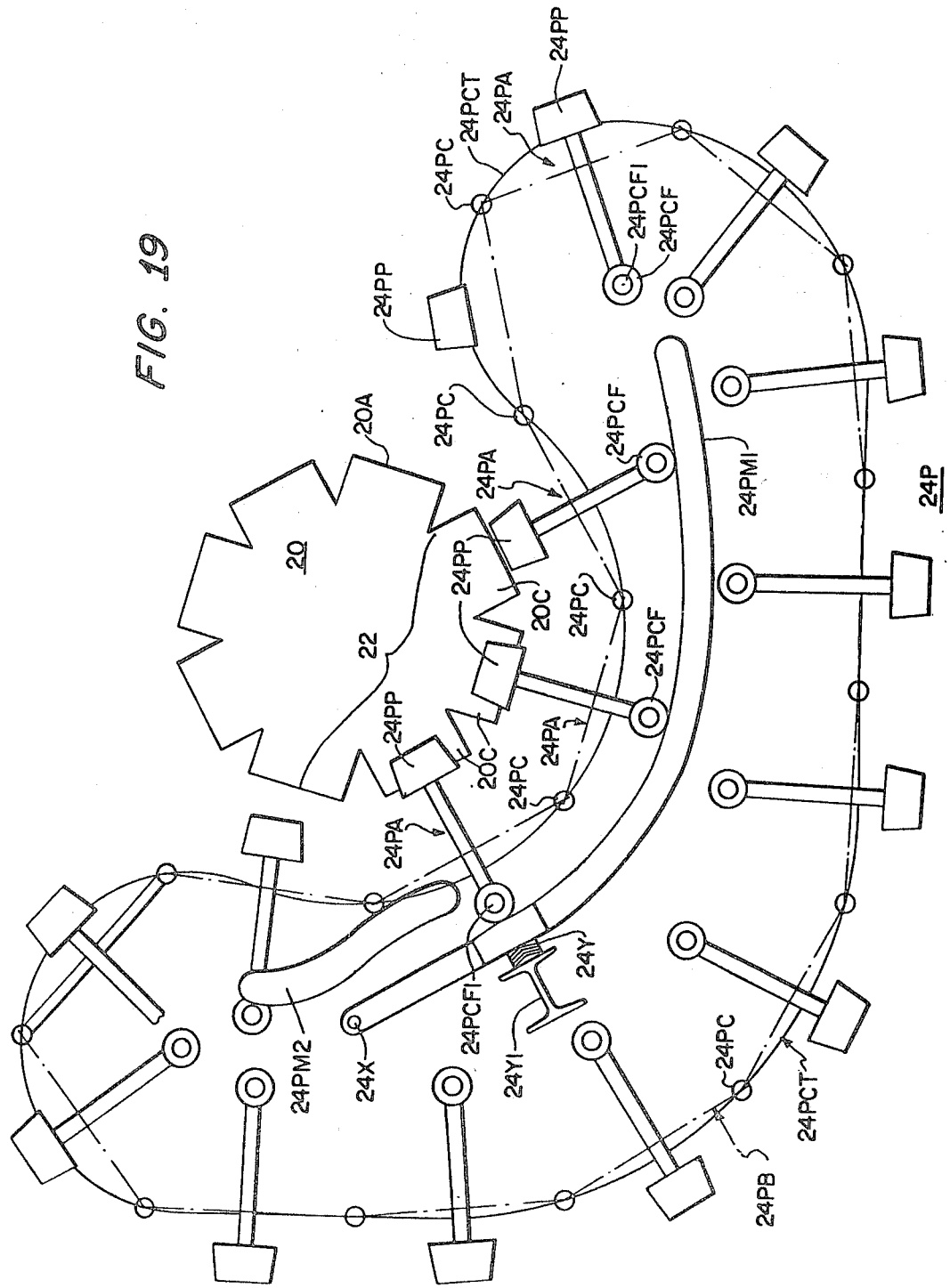

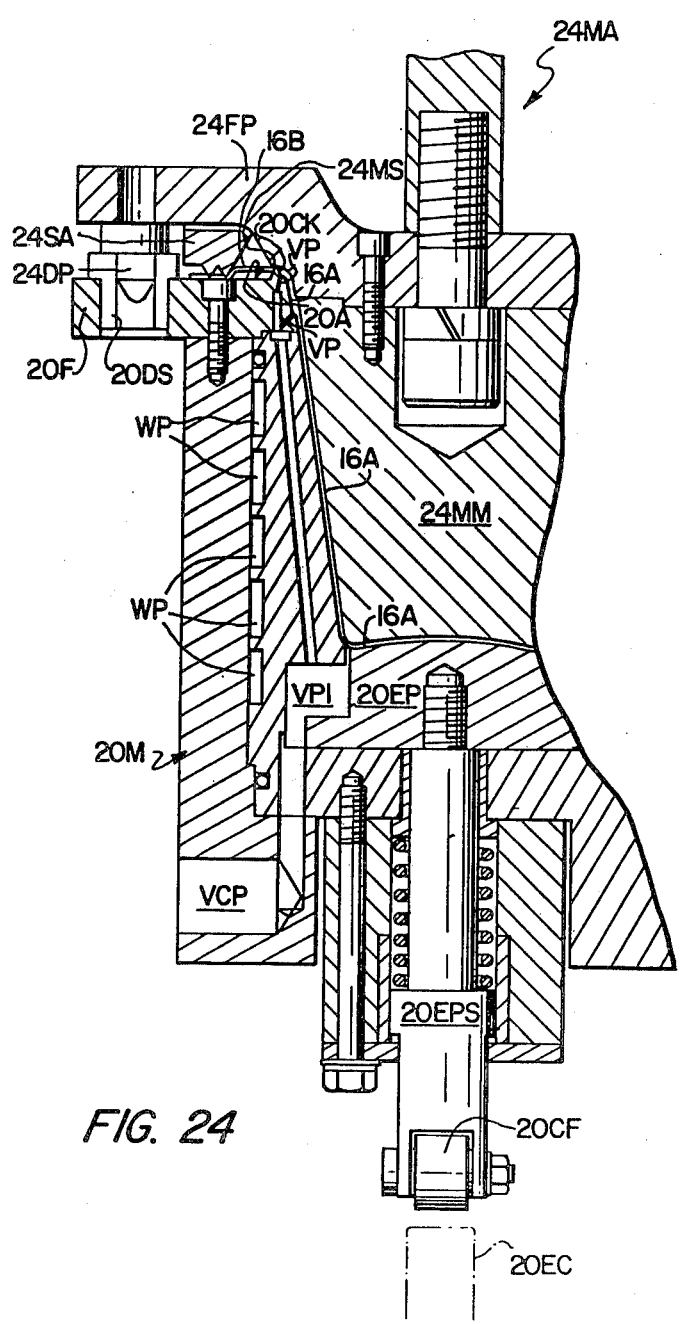
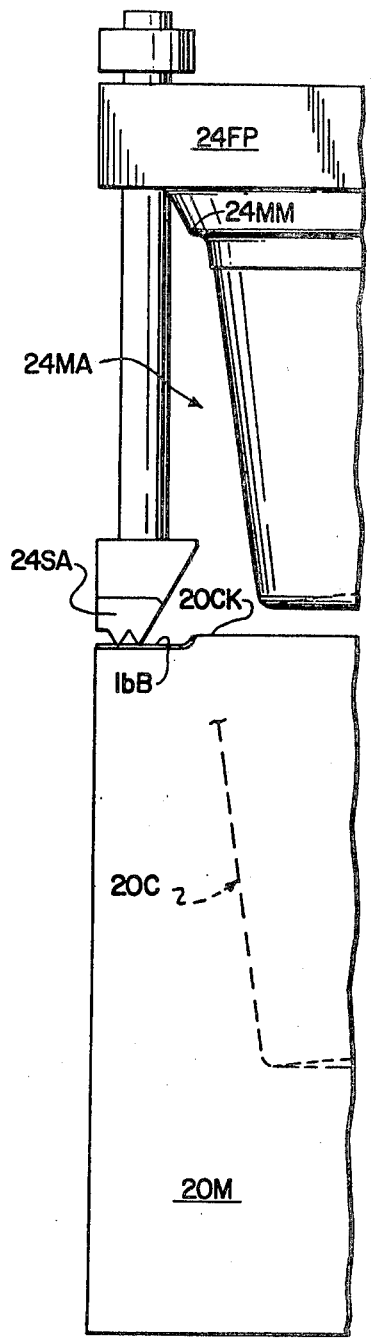
FIG. 24
FIG. 25

CONTINUOUS ROTARY THERMO-FORMING SYSTEMS AND APPARATUS OF THE PRESSURE ASSIST, PLUG ASSIST AND MATCH MOLD TYPE

This application is a divisional of copending application Ser. No. 177,582, filed on Aug. 13, 1980.

FIELD OF THE INVENTION

This invention relates to continuous rotary thermoforming system of the in-line type wherein an extruded web of thermoplastic material passes directly from the extrusion die to a continuous thermoforming apparatus. More particularly, the present invention relates to this type of thermoforming system in which pressure assist and plug assist and match mold means are provided to enhance the detail and/or depth of draw and resulting quality of the thermoformed articles manufactured thereby.

BACKGROUND OF THE INVENTION

In order to provide versatility to the equipment in thermoforming shallow items such as lids for containers and the like from both oriented and non-oriented thermoplastic materials of the solid (as opposed to foamed) type, orientation of such materials ordinarily requires temperatures to be lower than those for non-oriented materials in order to achieve proper retention of orientation in the finished product. Certain materials at these lower temperatures are more difficult to thermoform and provide the desired ultimate detail with only vacuum pressure behind the thermoforming draw. Accordingly, additional pressure or pressure assist is needed in order to enhance the detail in the finished product. This is provided by placing positive pressure on one side of the web being thermoformed with or without vacuum on the other.

In the prior art, this additional pressure was achieved by a clamshell type device consisting of a lid at one edge of the mold pivoted from a position across the mold face to a position 90° from the mold face to permit insertion and ejection of thermoformable web and finished product, respectively. However, because of the inertias involved in operating such a trap door or clamshell type pressure lid over a mold cavity, this system becomes very cumbersome at high speeds. The present invention is directed to pressure assist devices synchronized with rotary molding devices such that high speeds are achievable without the sacrifice of quality.

Continuous rotary in-line thermoforming devices operating at relatively high speeds of the plug assisted or match molding type require accurate indexing of the plug devices or male match molding devices with the mold cavities in a rotary mold wheel while at the same time keeping inertial changes to an optimal minimum.

It is an object of the present invention to provide continuous rotary in-line thermoforming systems and methods in which pressure, plug assist and match mold devices are accurately indexed at high speeds with the rotary mold means and mold cavities therein.

Another object of the present invention is to provide new and novel pressure assist means for rotary in-line thermoforming systems.

Still another object of this invention is to provide new and novel plug assist means and indexing and drive means for same for continuous rotary in-line thermoforming systems.

Yet another object of the present invention is to provide new and novel match mold means and indexing and drive means for same for continuous in-line rotary thermoforming systems.

These and other objects of the present invention will become more fully apparent with reference to the following specification and drawings which relate to several preferred embodiments of the present invention.

SUMMARY OF THE INVENTION

All of the systems of the present invention utilize a rotary mold wheel having a polygon-like shape with one or more mold cavities transversely disposed across each face of the polygon. A compatible number of pressure assist, plug assist or match mold devices to the number of mold cavities are provided in a continuous assist array of such devices. This assist array is driven in an endless loop which is so dimensioned and proportioned as to determine a particular arc length of engagement between each assist device and a particular mold cavity face of the rotary mold wheel.

The mold wheel itself is the driving and indexing device for the assist array, thereby assuring that proper indexing is effectuated at all speeds such as those on the order of 300 feet per minute and up. This linear speed refers to the speed of the extruded web material from which the thermoplastic articles are to be thermoformed.

The system is a continuous one in which the web is continuously extruded and the products are continuously cut from the web and stacked downstream of the rotary mold wheel with the web selvage being returned and recycled into the extrusion device.

The pressure assist devices utilized in this assist array of the present invention are shallow pistons reciprocable in a pressure cylinder and having a diameter slightly larger than the diameter of a sealing ring and back-up plate configuration which moves against the material and the mold face on the rotary mold wheel in synchronism with a certain arc of engagement over which air under pressure is supplied to the pressure cylinder against the piston and through the latter, against the material, to force the thermoplastic material into the mold cavity and enhance the detail of the draw. The mold cavity itself may have a vacuum applied thereto and the pressure assist and vacuum may combine to enhance the fidelity of the finished product with respect to detail within the mold cavity. The piston driving the back-up plate and the sealing ring is of a slightly larger diameter than the outer limit of the sealing ring and both of these are of larger diameter than the mold cavity such that a good seal and positive pressure thrust are provided regardless of pressure levels up to the practical limits of the equipment. A pressure commutator for feeding air under pressure to the pressure assist device is provided to supply that air over the major portion of the contact arc of the pressure assist device to effectuate the complete draw of the thermoplastic material into the mold cavities on the mold wheel.

In the case of the match molding and plug assist embodiment of the present invention, the plugs and match molds are indexed with the mold wheel from an assist array ganged together in an endless path and cam surfaces are provided together with cam followers on the plug and match mold elements which cause insertion and retraction of these elements into the mold cavities over a prescribed arc length of engagement with reference to the mold wheel. The plug assists operate over a shorter arc length engagement than the match mold devices since in the case of the latter, the articles thermoformed thereon must cool on the match mold device while the plug assist device is withdrawn and the final article is formed and cooled in the mold cavity.

Alternate embodiments of the match molding and plug assist devices of the present invention for shallow draw articles such as plates and trays may not require camming and its attendant radial displacement since the shallow draft will permit tangential merging and withdrawal of the array assist devices with the mold cavities in a synchronous and indexed manner.

In both the plug assist and the match mold embodiments of the present invention, means are provided for cutting the finished product from the web selvage on the face of the mold wheel to preclude the need for a downstream cutter device as used in the pressure assist embodiment of the present invention.

BRIEF DESCRIPTION OF THE DRAWINGS

FIG. 1 is a schematic of the continuous in-line rotary thermoforming system of the present invention with pressure assist for directly extruded non-oriented materials;

FIG. 2 is an enlarged detail elevation in schematic form looking into Line 2—2 of FIG. 1;

FIG. 3 is a schematic diagram of a continuous in-line pressure assisted rotary thermoforming system for oriented thermoplastic sheet materials;

FIG. 4 is a detailed elevation taken in schematic form along Line 4—4, FIG. 3;

FIG. 5 is a schematic layout of a continuous in-line thermoforming system illustrating the general flow and timing drive of the in-line continuous rotary thermoforming system of FIGS. 1 and 3 from a point downstream of the extruding die and/or extruding die and orienting device;

FIG. 8 is a side elevation of the detail of FIG. 6;

FIG. 9 is a detail illustrating the driving relationship between a rotary mold wheel and pressure assist device illustrated in schematic form;

FIG. 10 is a top plan view similar to FIG. 6 without break-away portions and illustrating further details of the drive means between the mold wheel and the pressure assist array;

FIG. 17 is a schematic illustration of a continuous in-line rotary thermoforming system of the present invention utilizing a plug assist array;

FIG. 18 is a detail looking into Line 18—18 of FIG. 17 of the pressure assist array;

FIG. 19 is a schematic flow diagram illustrating the arc of contact and timing of a plug assist continuous in-line thermoforming system of the present invention;

FIG. 24 is a partial cross section of a match mold station with the match mold plug inserted into the female die cavity of the mold wheel of the present invention; and FIG. 25 is a schematic illustration of the match mold plug in the withdrawn position from the surface of the mold wheel of the present invention.

DETAILED DESCRIPTION OF THE DRAWINGS

Figure 6:
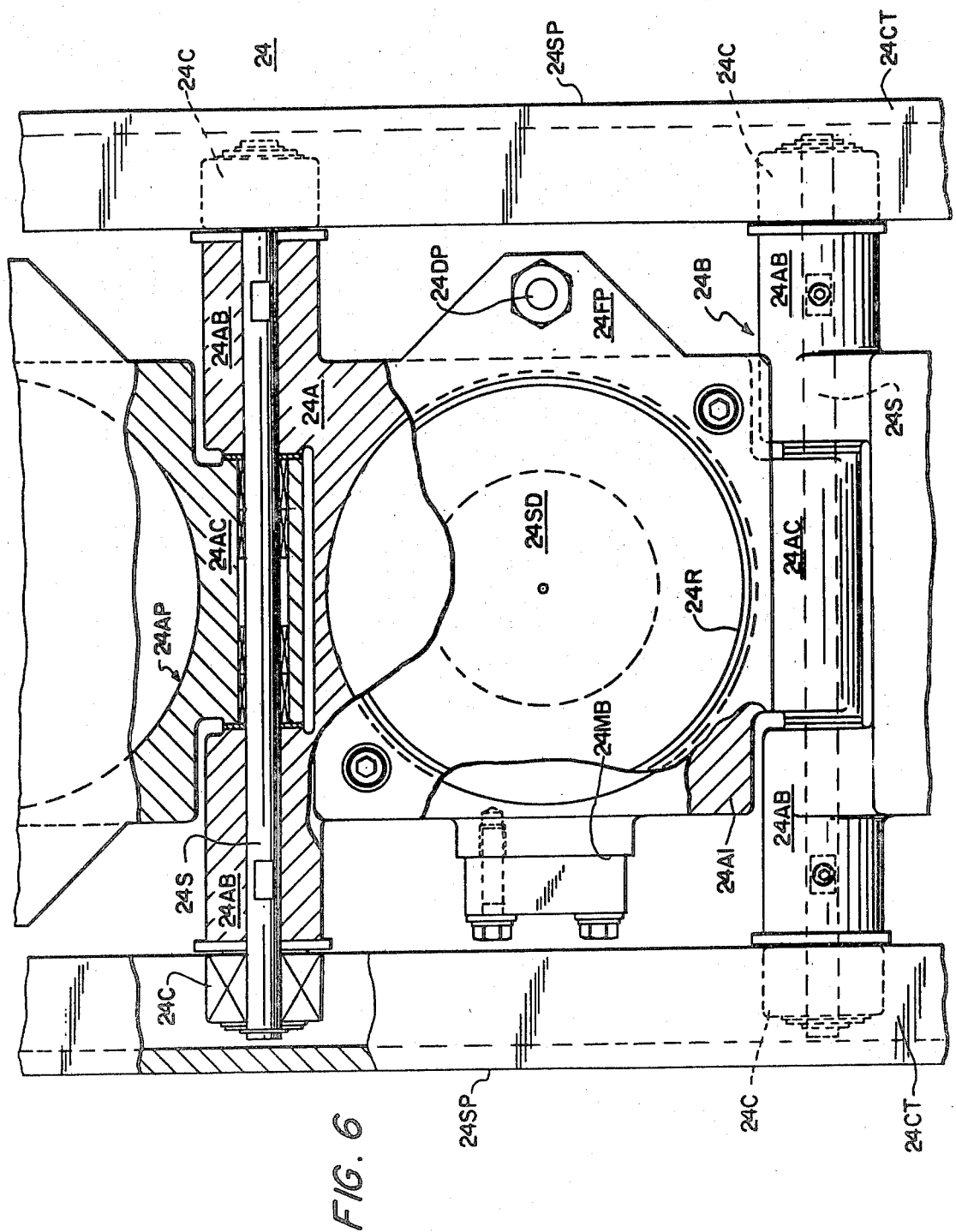
FIG. 6 is a top plan view in partial section and partially broken away of a pressure assist device and pressure assist array, in detail, of the type utilized in conjunction with FIGS. 1, 3 and 5.

Referring to FIGS. 1 and 2, a continuous in-line thermoforming system 10 which is primarily designed for non-oriented materials, is shown as including an extruder 12 having an input bin 12A and a control panel generally illustrated at 12B, which extruder feeds molten thermo-plastic material through a die assembly 14 to produce a web of material 16 which is reeved over an interfacing roller 18 in rolling contact through the said web 16 with the surface of a mold wheel 20.

The mold wheel 20 is engaged over a selected arc of contact 22 by a pressure assist array 24 which as generally illustrated consists of a plurality of pressure assist devices 24A in a continuous belt or chain configuration 24B. The devices 24A and the belt or chain arrangement 24B consisting of interlinked devices 24A are illustrated in more detail, albeit schematically, in FIG. 2.

As illustrated in FIG. 2, there may be a plurality of pressure assist devices 24A in the pressure assist array 24 across each link of the chain-like arrangement 24B thereof. This is illustrated in FIG. 2 as having three pressure assist devices 24A in each link of the chain array 24B. The pressure assist array 24 is also provided with cam follower outriggers 24C on either side of each set of pressure assist devices 24A as illustrated in FIG. 2. In the event that only a single pressure assist device 24A is provided at each link of the chain 24B together with a mold wheel 20 that has only single mold cavities in each mold face 20A thereof, then similar pairs of cam followers are provided on each of the single pressure assist devices 24A. The details of the individual pressure assist devices will be more fully described with reference to FIGS. 6 through 11 hereof.

A down-stream take-off device comprising a reversing roll 26 cooperates with the mold wheel 20 to remove thermoformed products from that wheel together with the web selvage with which the products are still integrally associated. The products 16A proceed from the reversing roll 26 downstream in the direction indicated by the adjacent arrow into engagement with a registration roll or indexing wheel 28 which acts to deliver the products 16A in the web 16 downstream to a cutting station 30 comprised of a cutter roll 30 and an anvil roll 30B which continuously cut the products 16A from the rest of the web 16 to thereby return web selvage 16B to a suitable granulator or the like (not shown) for recycling the material from the web selvage 16B back into the input portion 12A of the extruder 12. The individually thermoformed products 16A are collected in a stack assembly 32 downstream of the cutter station 30 such that all of the thermoformed articles may be dispensed in suitable stacks or configurations or subsequent packaging and removal from the in-line thermoforming configuration 10.

Similar to the continuous in-line thermoforming system 10 of FIG. 1, a system 10A is illustrated in FIGS. 3 and 4 for handling oriented thermoplastic materials which have been biaxially oriented upstream of the mold wheel 20 by an orientation assembly 34 consisting of a transverse stretcher assembly 34A positioned between an upstream array of longitudinal stretching rolls 34B and a downstream array of longitudinal stretching rolls 34C. The downstream-most one of the stretching rolls 34C replaces the lay-on or interfacing roll 18 of FIG. 1 to place the now oriented web 16 onto the surface of the mold wheel 20 slightly upstream from the arc of engagement 22 of the pressure assist array 24 with the said mold wheel 20.

Between the upstream longitudinal stretcher rolls 34B and the extrusion die 14, the web 16 passes over an array of cooling rolls 36 reducing the temperature in the web 16 to a level suitable for orientation thereof. Except for these differences, the system in FIGS. 3 and 4 is identical to that of FIGS. 1 and 2.

Referring next to FIG. 5, a timing schematic and the shape of the periphery of the mold wheel 20 together with a corresponding peripheral shape on the indexing roll 28 is illustrated. The FIG. 5 system is identified as the assembly 10A since it is illustrated with an orientor assembly 34 in which downstream rollers 34C cause the laying on of the web 16 on the surface of the mold wheel 20.

As further illustrated, the entire orientor assembly 34, mold wheel 20, the pressure assist array 24, downstream indexing roll 28 and cutter station 30 are all mounted on rollers R on tracks T on a floor F for the purpose of relatively positioning the orientor with respect to the remainder of the assembly and to provide the track T by which the downstream assemblies such as stackers and packagers can be properly associated with the apparatus in a similar manner.

The mold wheel 20 is illustrated as including a plurality of peripheral mold faces 20A which are located across cords of the circle defining the side elevation of the mold wheel 20 such that the mold wheel has a polygon-shaped side elevation.

The indexing wheel 28 has a similar plurality of indexing faces 28A dimensionally identical to the mold faces 20A in cord length such that the portions of the web 16 which have been deformed or otherwise upset by the thermoforming operation on the mold wheel 20 will be indexed by similar dimensions to the mold faces 20A on the indexing roll 28. These indexing faces 28A cause the proper positioning of ultimate thermoformed products in the web 16 to be in registry with the cutting station 30 and the cutting roll 30A and back up roll 30B to insure accurate removal of the thermoformed products from the web selvage 16B. The mold products were previously identified and illustrated in FIGS. 1 and 3 as products 16A, although these are not illustrated in the schematic illustration of FIG. 5.

After the web selvage 16B exits the cutting station 30, it is reeved around a pair of tension rolls 38A and 38B from whence it is redirected back towards a granulator station (not shown) for recycling to the extruder 12 (shown in FIGS. 1 and 3).

The various rotary components of the continuous inline thermoforming system 10A are driven from a main timing pulley TP through a timing belt TB which engages a drive sprocket DS on a main drive shaft DSL, the latter being driveably connected through drive gearing DG to the back up roll assembly 30B which in turn is geared through drive gearing DG1 to the cutting roll 30A to synchronize the cutting roll 30A with the back up roll 30B at the cutting station 30. Also, the back up roll drives, through peripheral gearing DG2, the indexing wheel 28. Synchronization of the indexing wheel 28 with the mold wheel 20 is achieved through a chain drive CD extending from a first sprocket CD1 on the back up roll 30B to a second sprocket CD2 on a mold wheel 20.

Synchronization of the pressure assist array 24 and the pressure assist devices 24A (shown in FIGS. 1 and 3) thereon with the mold cavities in the mold faces 20A of the mold wheel 20 (to be hereinafter fully illustrated and shown) is achieved by driving interconnection between the mold wheel 20 and the pressure assist array 24.

Figure 7:
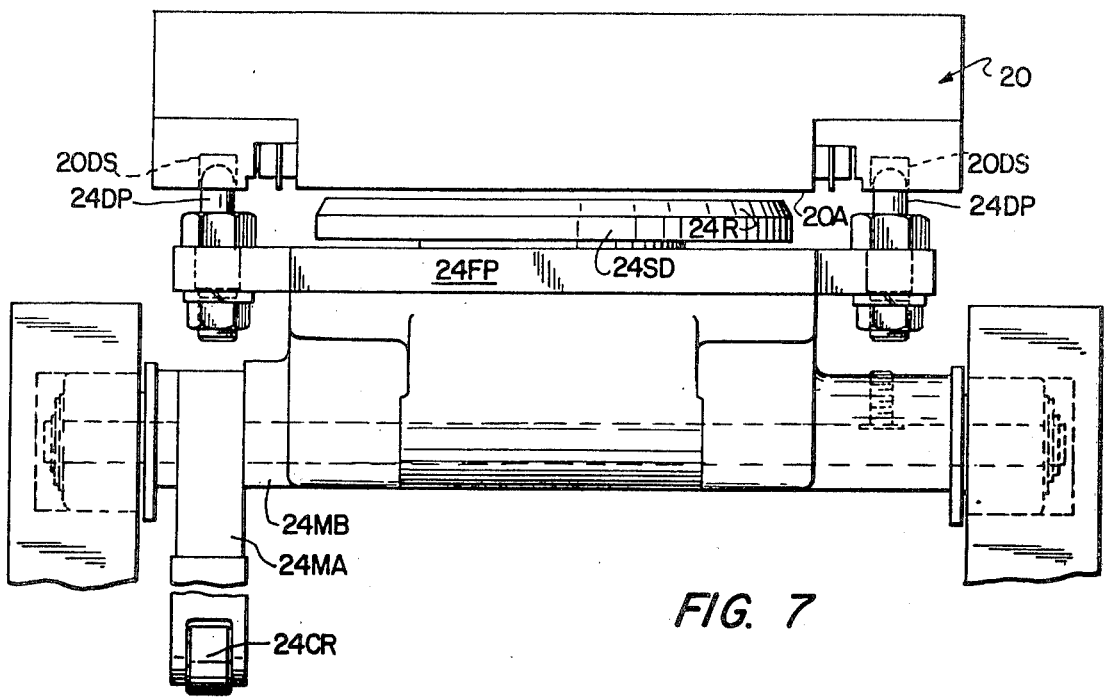
FIG. 7 is an end view of a single pressure assist device station of the type illustrated in FIG. 6.

Referring now to FIGS. 6, 7 and 8 a preferred embodiment of a general drive configuration for the pressure assist array 24 is shown as including first and second side plates 24SP in which cam tracks 24CT are provided such that the cam followers 24c on the pressure assist chain configuration 24B at each of the pressure assist devices 24A will ride in these cam tracks 24CT in the said side plates to determine the relative position between each pressure assist device 24A and a corresponding mold face 20A on the mold wheel 20.

The chain configuration 24B of the pressure assist array 24 is shown as including a transverse cam follower shaft 24S for each pair of cam followers 24C extending through interfitting pivots in a chain link arrangement whereby aluminum castings 24A1 have pair of bushings 24AB at one end on the outboard sides of the case hardened shaft 24S and a single bushing 24AC on the other end. The latter is fitted between the outboard bushing 24AB on a common cam follower shaft 24S to form a chain link interconnection which is repeated for each and every junction between adjacent pressure assist devices 24A around the entire array 24 to thereby define the chain configuration 24B.

Suitable set screws and keys and thrust bearings are provided to maintain the positions of the bushings 24AB and 24AC in proper perspective on the cam follower shaft 24S.

As illustrated in FIG. 6, the aluminum casting or housing 24AL of each pressure assist device 24A includes an internal pressure chamber 24AP in which a piston is positioned underlying an exposed circular sealing disk 24SD which has an upraised peripheral rim 24R which is adapted to tightly engage a respective mold face 20A on the mold wheel 20 as will hereinafter be more fully described.

The close juxtaposition of the sealing disk 24SD and its upturned flange 24R with the mold face 20A of the mold wheel 20 is illustrated in FIGS. 7 and 8.

The pressure assist array 24 is provided with upstanding drive pins 24DP which are firmly secured in a steel face plate 24FP. These drive pins 24DP are diametrically positioned with respect to the sealing disk 24SD in a transverse disposition across each pressure assist device 24A and cooperate with drive sockets 20DS positioned centrally of the mold faces 20A at the outboard reaches thereof such that the drive sockets 20DS on the mold wheel 20 engage the drive pins 24DP on each pressure assist device 24A in the pressure assist array 24, in sequence, to fully drive the pressure assist array 24 and chain configuration 24B thereof in full synchronism with the mold wheel 20. Thus, each mold face 20A will be properly indexed in registry with a corresponding pressure assist device 24A regardless of the linear speed at which the continuous in-line thermoforming systems 10 and 10A are operated.

As further illustrated in FIGS. 7 and 8, a dependent cam follower roller 24CR, also connected with each of the cam follower shafts 24S, is configured to be disposed beneath the centerline of the sealing disk 24SD and in line with one of the drive pins 24DP as illustrated. The purpose of this cam roller 24CR will be further described hereinafter with respect to the description of operation of the present invention.

Referring next to FIG. 9, the mold wheel 20 is illustrated in a partially enlarged detailed schematic to illustrate three of the mold faces 20A and the relative position of the drive sockets 20DS with respect to the drive pins 24DP and the general pressure assist device structure 24A.

Figure 11:
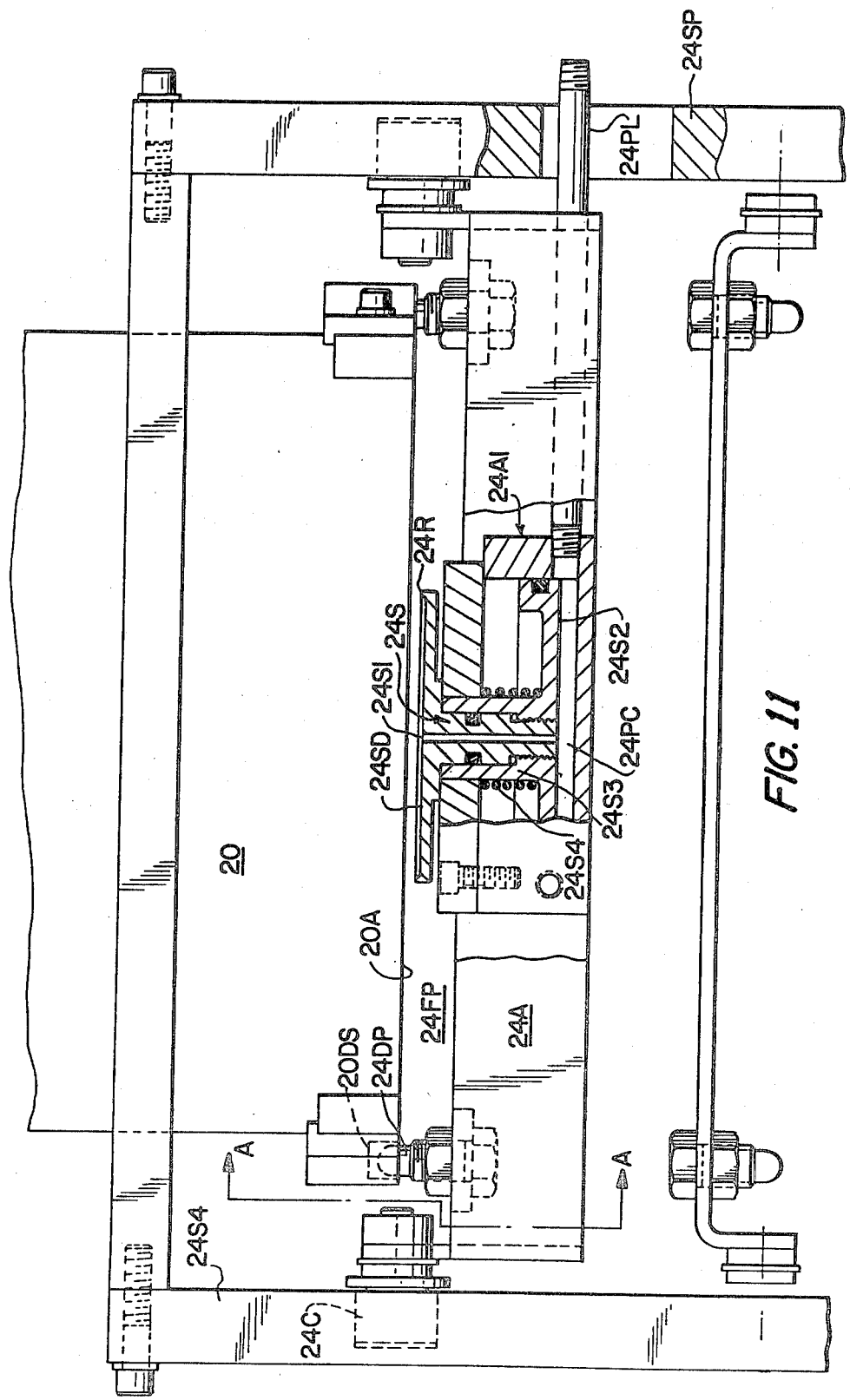
FIG. 11 is an end view of the pressure assist device and array of FIG. 10 in partial cross section to illustrate the internal detail of the pressure assist device.

FIGS. 10 and 11, wherein like numerals designate like components to those of FIGS. 3 and 4, further illustrate the sealing disk 24SD, the raised sealing rim 24R and the drive pins 24DP in a more schematic configuration which shows a pressure line 24PL extending from the right-hand side of the aluminum housing 24AL outboard to a position though a slot in the side plate 24SP to provide a pressure connection with a pressure commutator of any suitable type known in the art (not shown).

As further illustrated in FIGS. 10 and 11 the sealing disk 24SD is integrally formed on a stem 24S which has a flow port 24S1 axially formed therethrough that communicates with the space defined between the mold face 20A and the upturned sealing rim 24R of the sealing disk 24SD and the interior of pressure chamber 24PC at the opposite end of the stem 24S. The pressure chamber 24PC contains a piston 24S2 telescopically interfitted by a shank 24S3 with the stem 24S of the sealing disk 24SD. The piston 24S2 is spring-biased by means of a suitable coil spring 24S4 or the like downward into the pressure chamber 24PC such that the tendency is for the sealing disk 24SD, in the absence of actuating pressure within the pressure chamber 24PC, to be withdrawn with the piston 24S2 away from the mold face 20A on the mold wheel 20.

The drawn assisting pressure for the mold cavities in the mold wheel 20, to be be hereinafter more fully described, is provided through the axial port or bore 24S1 from the pressure chamber 24PC to thereby fill the entire area defined by the upturned sealing rim 24R against the mold face 20A with assisting pressure acting in conjunction with vacuum within the mold cavity, as will hereinafter more fully described, to provide a pressure assist to the draw of the mold wheel 20 during thermoforming.

The cam rollers 24CR illustrated in FIGS. 7 and 8 are dependent from a central mounting boss 24MB from which a dependent mounting arm 24MA extends to hold the cam roller 24CR in a bifurcated end portion thereof.

Figure 15:
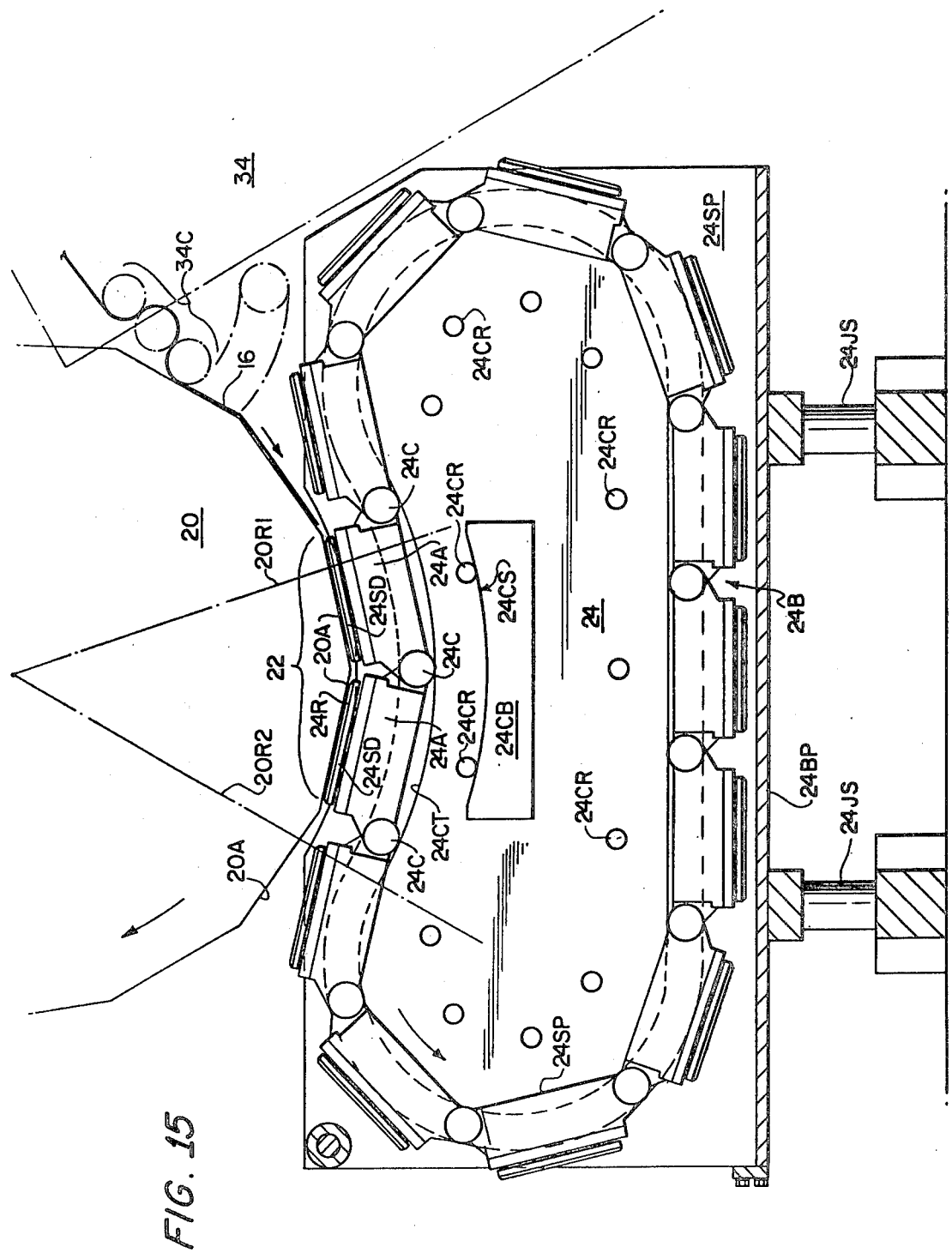
FIG. 15 is a side elevation schematic illustrating the arc of contact between a rotary mold wheel and a pressure assist array of the present invention.

These cam rollers 24CR are for the purpose of engaging a supporting cam surface 24CS formed in a cam block 24CB which is affixed to that side plate 24SP which is immediately adjacent to the cam rollers 24CR as illustrated in FIG. 15.

As each of the individual pressure assist devices 24A in the chain configuration 24B of the pressure assist array 24 travel along the cam track 24CT, the dependent cam rollers 24CR engage the cam surface 24CS on the cam block 24CB over an arc commensurate with the arc of contact 22 between the pressure assist devices 24A and the mold faces 20A on the mold wheel 20. The mold wheel 20 is provided with a source of vacuum to the mold cavities therein as will be hereinafter more fully illustrated with reference to FIGS. 12 through 14, such that from a radius line 20R1 through a radius line 20R2, commensurate with the length of the arc of contact 22, (on the order of 38 peripheral degrees) a vacuum is applied to the mold wheel 20 to force the web 16 into the mold cavities therein. The pressure commutator for the pressure assist devices 24A is also activated over this span such that pressure is applied from the pressure assist devices 24A through the previously described axial port 24S1 and the sealing disk 24SD forces the sealing rim 24R against the web 16 on the mold face 20A of the mold wheel 20 to apply pressure to assist the draw of the web 16 at the same time vacuum is applied to the opposite side thereof.

The dependent cam rollers 24CR engaging the cam surface 24CS provide additional support to the pressure assist devices 24A and accordingly, additional assistance to the cam followers 24C in opposing the load on the cam followers 24C caused by the pressurization of the pistons 24S2 in the pressure assist devices 24 and the resulting pressure back through the raised rims 24R on the sealing disks 24SD acting against the mold faces 20A of the mold wheel 20.

Figure 16:
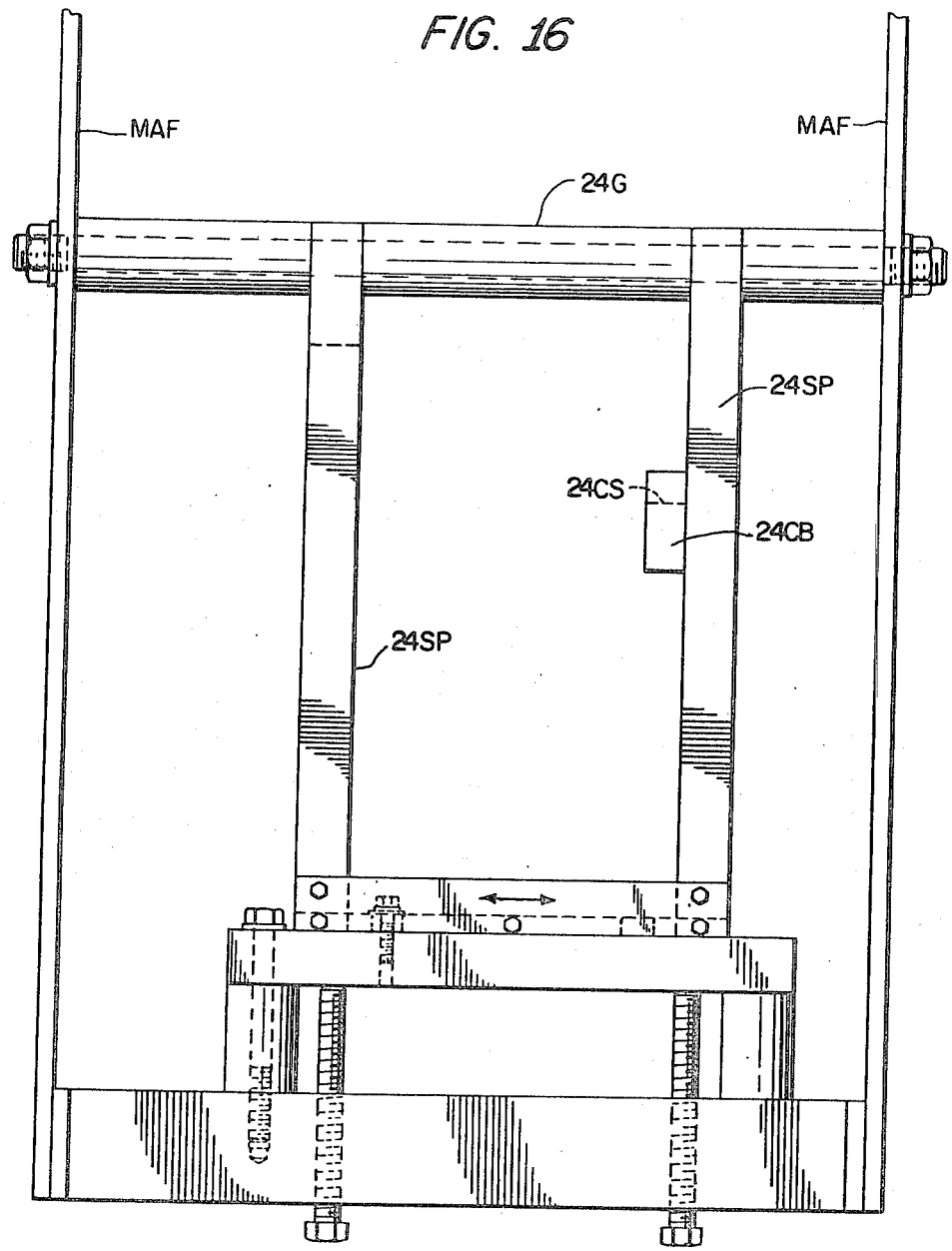
FIG. 16 is an end view illustrating the mounting means for supporting a pair of plates including cam tracks and an actuating cam for the arc of contact of the pressure assist array of FIG. 15.

As further illustrated in FIGS. 15 and 16, the side plates 24SP are illustrated as being mounted by means of the bed plate 24BP, jack stands 24JS, and an upper crossbar 24G, thus maintaining both of the side plates 24SP in a fixed relationship to a machine frame 10F in which the mold wheel 20 and other components can be mounted in fixed relationship with respect to the pressure assist array 24.

Figure 14:
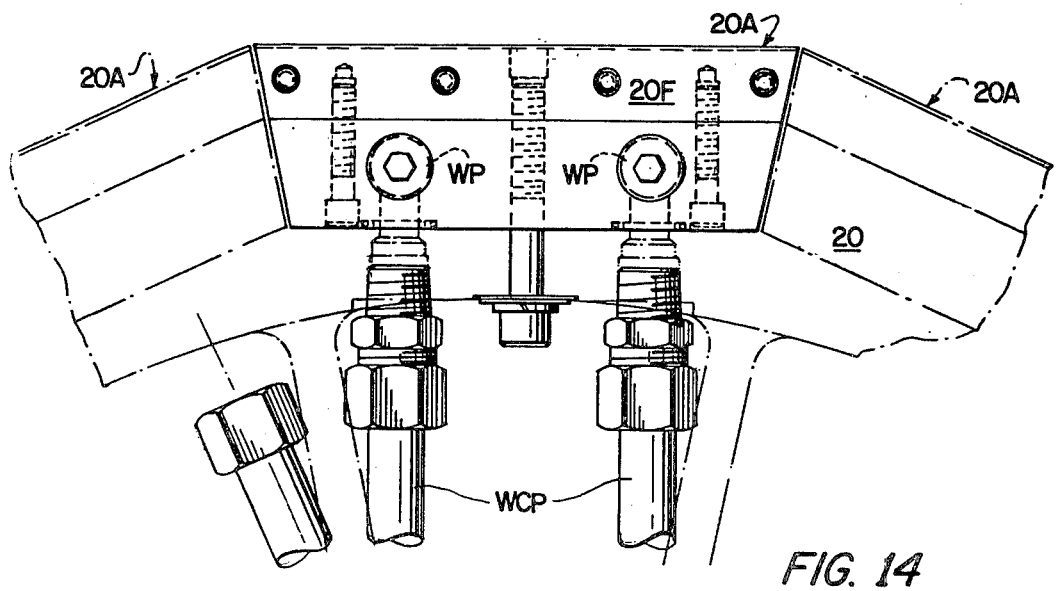
FIG. 14 is a side elevation of a mold wheel of the present invention including a side elevation of the single mold face of FIG. 12.
Figure 12:
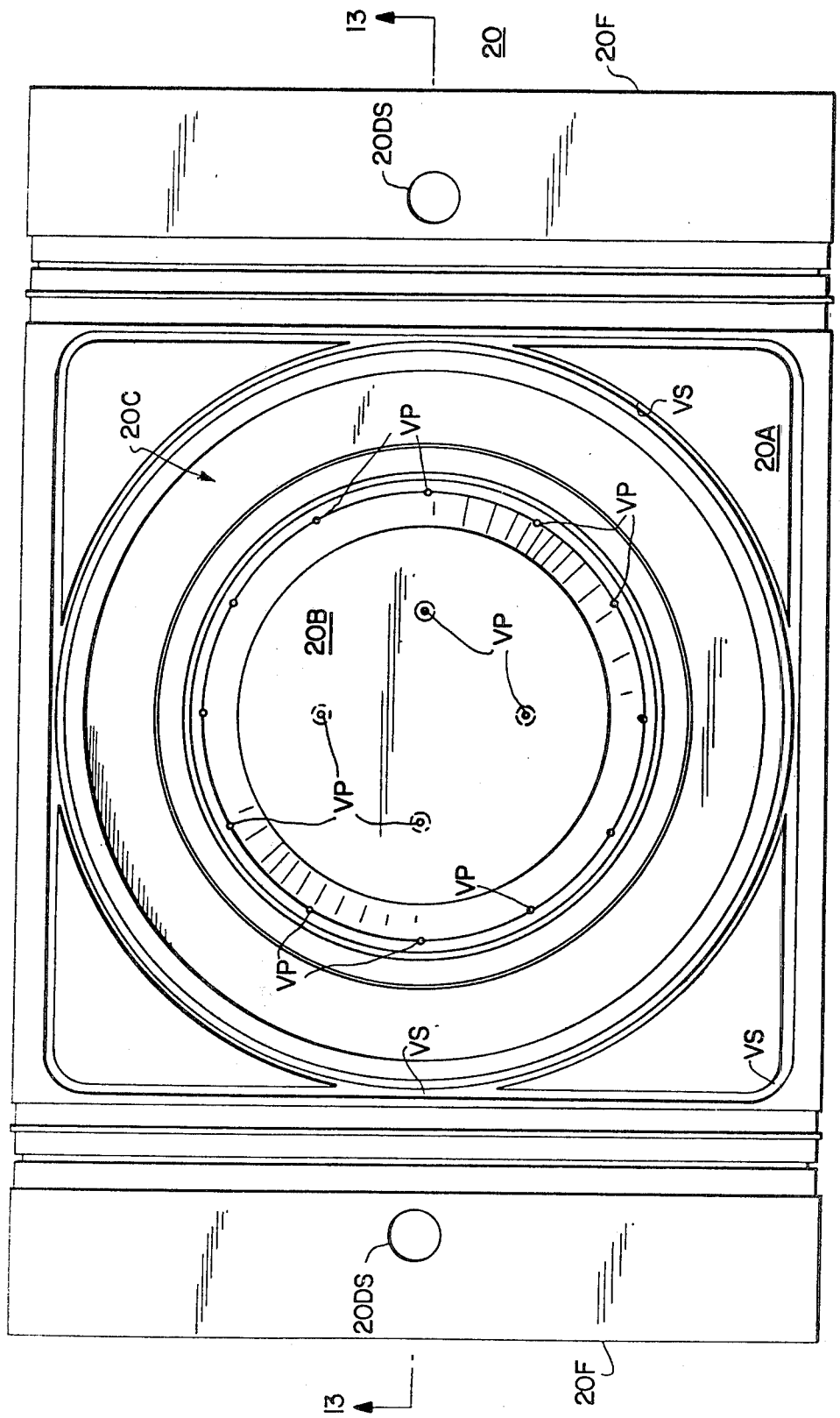
FIG. 12 is a top plan view of a single mold face and die cavity for cooperation with a pressure assisted continuous in-line thermoforming system of FIGS. 1, 3, and 5.
Figure 13:
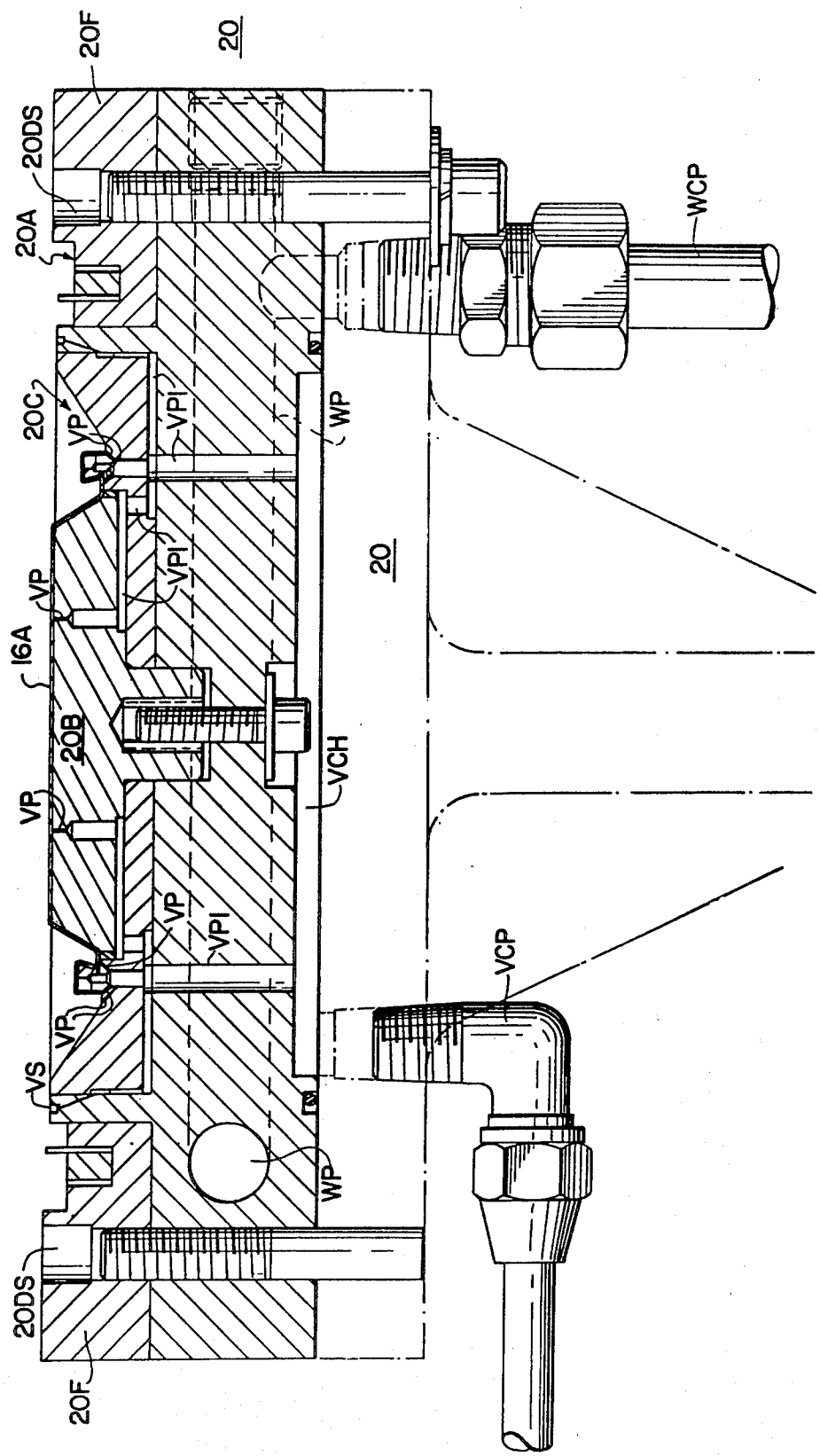
FIG. 13 is a cross section taken along Line 13—13 of FIG. 12.

In referring jointly to FIGS. 12, 13, and 14, the details of the mold faces 20A of the mold wheel 20 are illustrated as including outboard drive pin sockets 20DS which are defined in outboard inserts 20F on the lateral edges of the mold wheel 20. These outboard inserts 20F are coextensive with the mold faces 20A in the peripheral rotational direction of the latter, that direction being generally indicated by the arrows in FIGS. 12 and 14.

Set into the mold faces 20A is a mold configuration 20B which defines a mold cavity 10C in the surface of the mold face 20A. The die configuration 20B in the embodiment illustrated is for a molded cup lid or the like which is shown in cross-sectional profile in FIG. 13 as the product 16A.

As illustrated in FIGS. 12 and 13, a plurality of vacuum ports VP are provided in a suitable array together with a vacuum slot VS which is peripherally disposed both in a rectangular configuration around the mold face 20A and a circular configuration around the mold cavity 20C to cause the hot web material 16 to be drawn into the mold cavity 20C and cause the information of the thermo-formed product 16A which in the present embodiment is illustrated as a lid for containers.

The vacuum force applied to the vacuum ports VP and the vacuum slots VS is applied to a vacuum chamber VCH from a vacuum coupling VCP which in turn is connected to a vacuum supply (not shown) of suitable strength to cause the proper depth of draw in the mold cavity 20C. The vacuum chamber VCH is connected through a plurality of internal vacuum passages VP1 to the various vacuum ports VP and the vacuum slots VS as best illustrated in FIG. 13. Also provided for each of the mold faces 20A are water input and output couplings WCP, which are illustrated in FIGS. 13 and 14 as connected with water passageways WP within the mold assemblies 20P. This provides cooling to the mold 20B and mold faces 20A. To set the thermoformed products 16A in their drawn forms and shapes subsequent to their ingestion by the vacuum and the pressure assist of the present invention into the mold cavities 20C.

The Plug Assist Embodiment

Referring to FIGS. 17 and 18, a plug assist continuous in-line thermoforming system 10B is illustrated with like components to the embodiments identified as continuous in-line thermoforming systems 10 and 10A bearing identical numerals.

The mold wheel 20 in the plug assist embodiment 10B is illustrated as being in cooperative relationship with an adjacent plug assist array 24P having plug assist stations 24PA positioned thereabout in a similar manner to the pressure assist stations 24A by means of cam followers 24PC on opposite sides of a chain configuration 24PB which cause the pressure assist plug stations 24PA to track with the periphery of the mold wheel 20 over an arc of contact 22.

An additional cam means 24PM is schematically indicated in FIG. 17 as cooperating with dependent cam follower rollers 24PCF which follow the cam 24PF to cause pressure assist plugs 24PP to be inserted into the mold cavities 20C in the mold wheel 20 over the arc of contact 22.

Referring additionally to FIG. 19, the cam followers 24PC on the lateral edges of the chain configuration 24PB cooperate with an external cam track schematically illustrated as 24 PCT such that the entire plug assist station 24PA is caused to generally follow the peripheral contour of the mold wheel 20 over the arc of contact 22. Then, while the respective plug assist stations 24PA are in close proximity to the periphery of the mold wheel 20, adjacent to mold faces 20A and the respective mold cavities 20C therein, the internal cam followers 24PCF first engage an insertion cam portion 24PM1 of the internal cam 24 PM to cause insertion of a given pressure assist piston 24PP into the mold cavities 20C on adjacent mold faces 20A of the mold wheel 20. This occurs initially over the first forty-five degrees of the arc 22 in the embodiment illustrated in FIG. 19 for an eight-mold wheel (commercial embodiments may have as many as thirty stations or more). This piston 24PP is held in the cavity 20C for the sixty degrees of arc 22 and is then opened, i.e., withdrawn from the mold 20C over the next forty-five degrees of arc by means of a retrieve portion 24PM2 of the internal cam 24PM.

The insertion of cam portion 24PM1 has a pivotal mounting 24X at one end there of and is cantilevered over a stack of Belleville springs 24Y acting as a fulcrum set against a solid base such as an I-beam 24Y1 or the like.

These stacked Belleville springs 24Y provide a resilient fulcrum which provides a small amount of axial play in the closed-most position of each of the pressure assist plugs 24PP such that an integral cutter on these plugs, to be hereinafter more fully described with reference to FIG. 20, will be forced against the mold face 20A to cut the products 16A (shown in FIG. 17, for example, and in FIG. 20 as will be hereinafter more fully described from the web selvage 16B on the mold wheel 20, thereby eliminate the cutter station 30 of FIG. 17.

Figure 20:
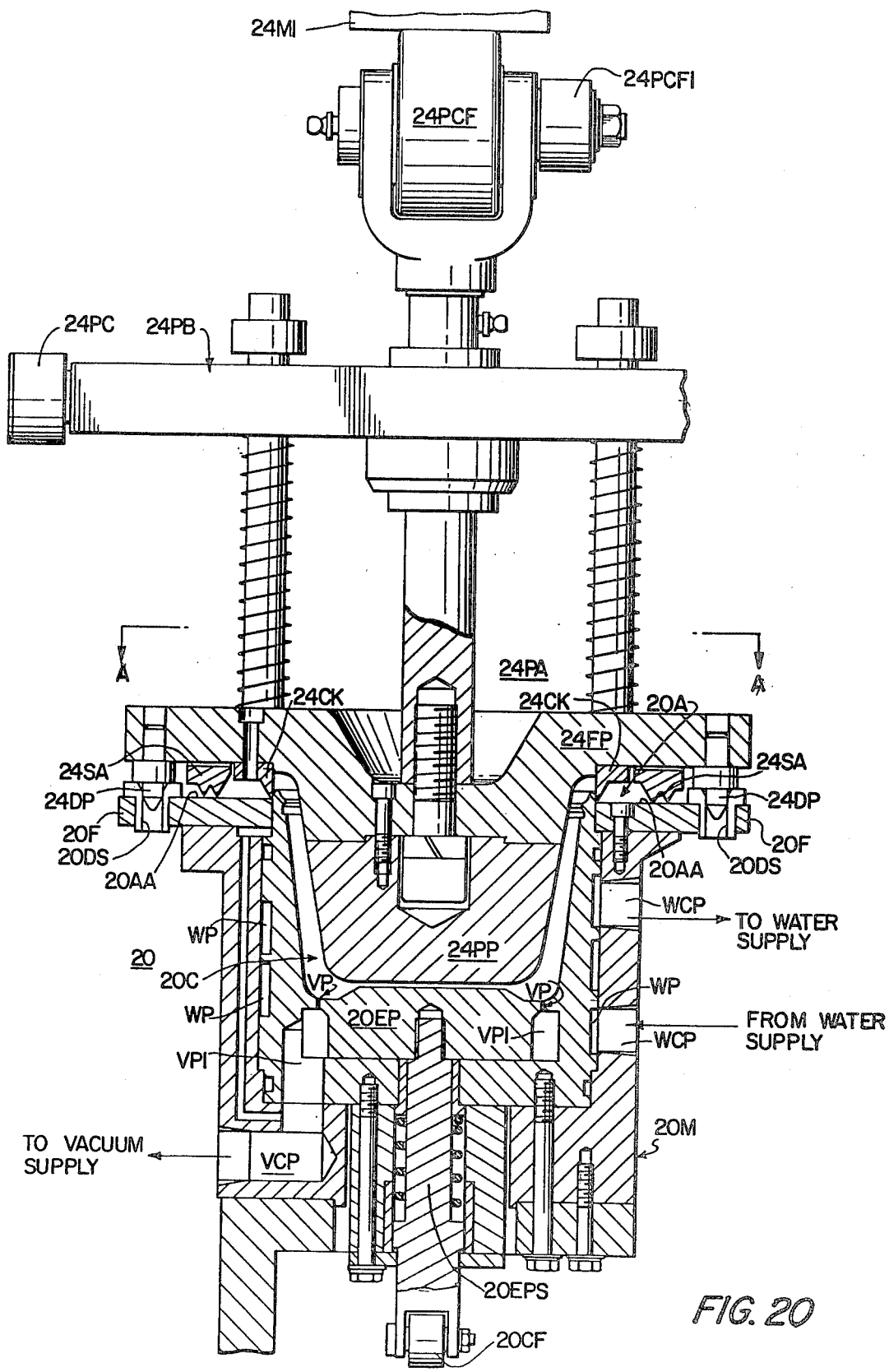
FIG. 20 is an enlarged detail and partial cross section illustrating a plug assist device fully inserted into a mold cavity on a mold wheel.
Figure 21:
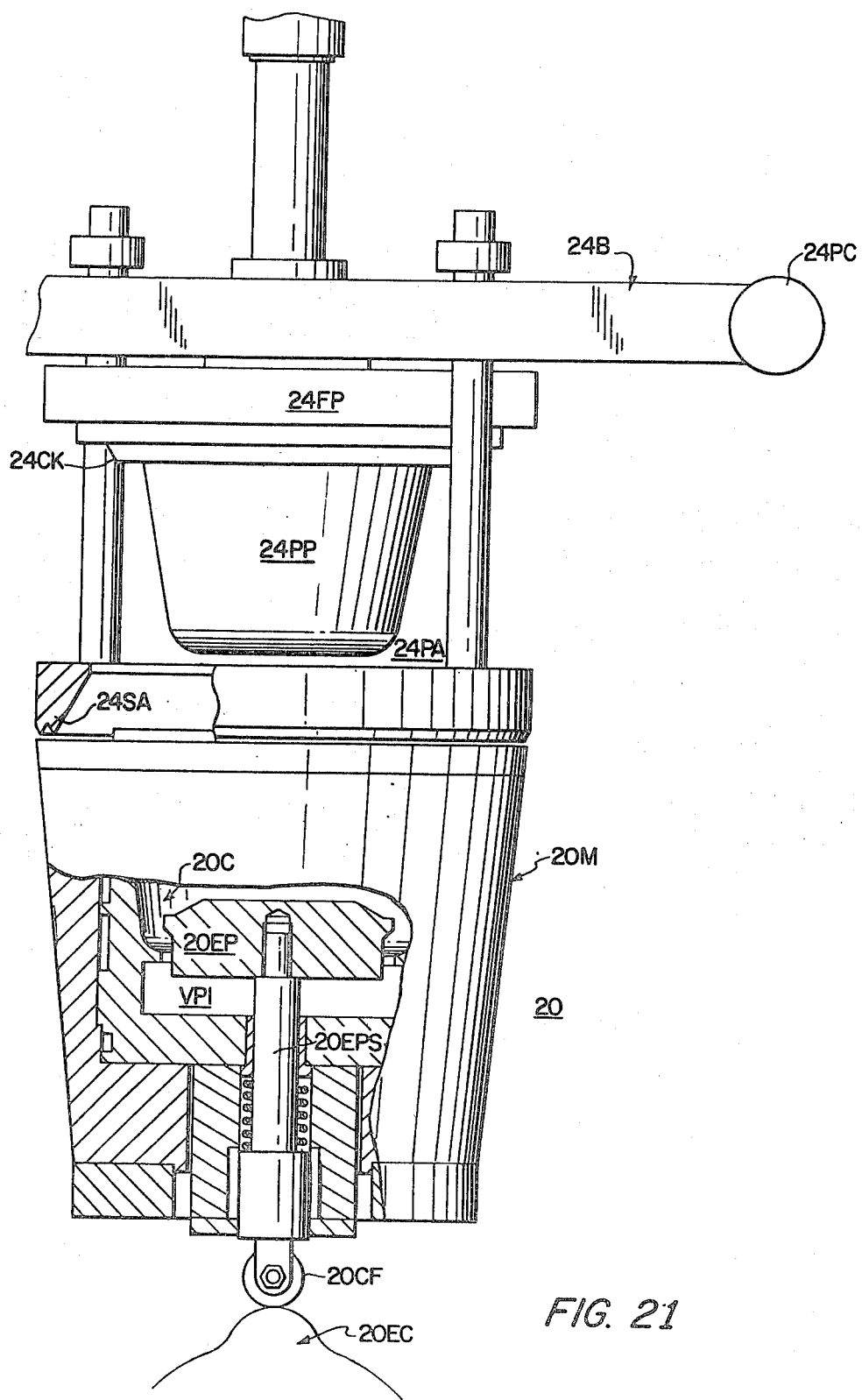
FIG. 21 is an enlarged detail and partial cross section illustrating a plug assist station drawn from a mold cavity of the present invention with the mold cavity being in the initial stages of a product eject mode.

Referring now to FIGS. 20 and 21, FIG. 20 shows a pressure assist plug 24PP fully inserted into the mold 20C with the internal cam follower 24PCF engaged with the insertion cam 24PM1 at a point immediately above the Belleville spring fulcrum 24Y such that an annular cutting knife 24CK, illustrated in section in FIG. 20 and in side elevation in FIG. 21, is caused to engage a hardened surface portion 20AA on the mold face 20 and in particular, on the outboard inserts 20F holding the drive pin sockets 20DS which cooperate with the drive pins 24DP mounted on each of the plug assist stations 24PA. The drive assembly between the mold wheel 20 and the plug assist stations 24PA is substantially identical to that described with respect to FIGS. 7 through 13.

The difference is in the internal camming to actuate the pressure assist plugs 24PP into and out of the mold cavities 20C which are deeper in the present embodiment than those in the pressure assist embodiment. A vacuum conduit VCP is provided internally in the mold and is adapted to be connected to a vacuum supply (not shown) to supply vacuum to the mold cavity 20C through internal vacuum passages VP1 and vacuum ports VP in the bottom portion of the mold cavity 20C. Water cooled ports WCP connected to a source of cooling water, not shown, are provided together with internal water passages WP to provide the necessary thermal cooling and temperature control for the various mold cavities 20C.

The bottom of the mold cavity 20C is defined by an ejection piston 20EP which extends down through a shaft 20EPS to a cam follower 20CF which cooperates with an ejection cam 20EC, in the manner shown in FIG. 21 to push the finished molded product 16A (not shown therein) upward from the bottom of the mold cavity 20C to break it free of the walls of the mold cavity and permit its subsequent ejection therefrom by air pressure or the like reversibly connected through the vacuum coupling VCP.

Also illustrated in FIGS. 20 and 19 is the fact that the internal cam follower 24PCS has a smaller diameter cam follower 24PCF1 disposed coaxially therewith and adjacent thereto for the purpose of engaging the retrieve cam portion 24PM2 during the plug assist thermoforming cycle in the mold wheel 20.

Also, each plug assist station 24PA includes a sealing annulus 24SA which engages the hardened surface 20AA outward of the cutting knife 24CK to assist in maintaining the web material 16 in proper position on the mold wheel 20 during the draw of the finished products 16A into the mold cavities 20C. The sealing annulus 24SA may be made of a material which is somewhat resilient to permit the additional pressure of the Belleville spring fulcrum 24Y to cause a slight axial displacement of the pressure plug 24PP via the cam follower 24PCF to engage the cutting knife 24CK with the hardened surface 20AA on the mold wheel 20.

Figure 22:
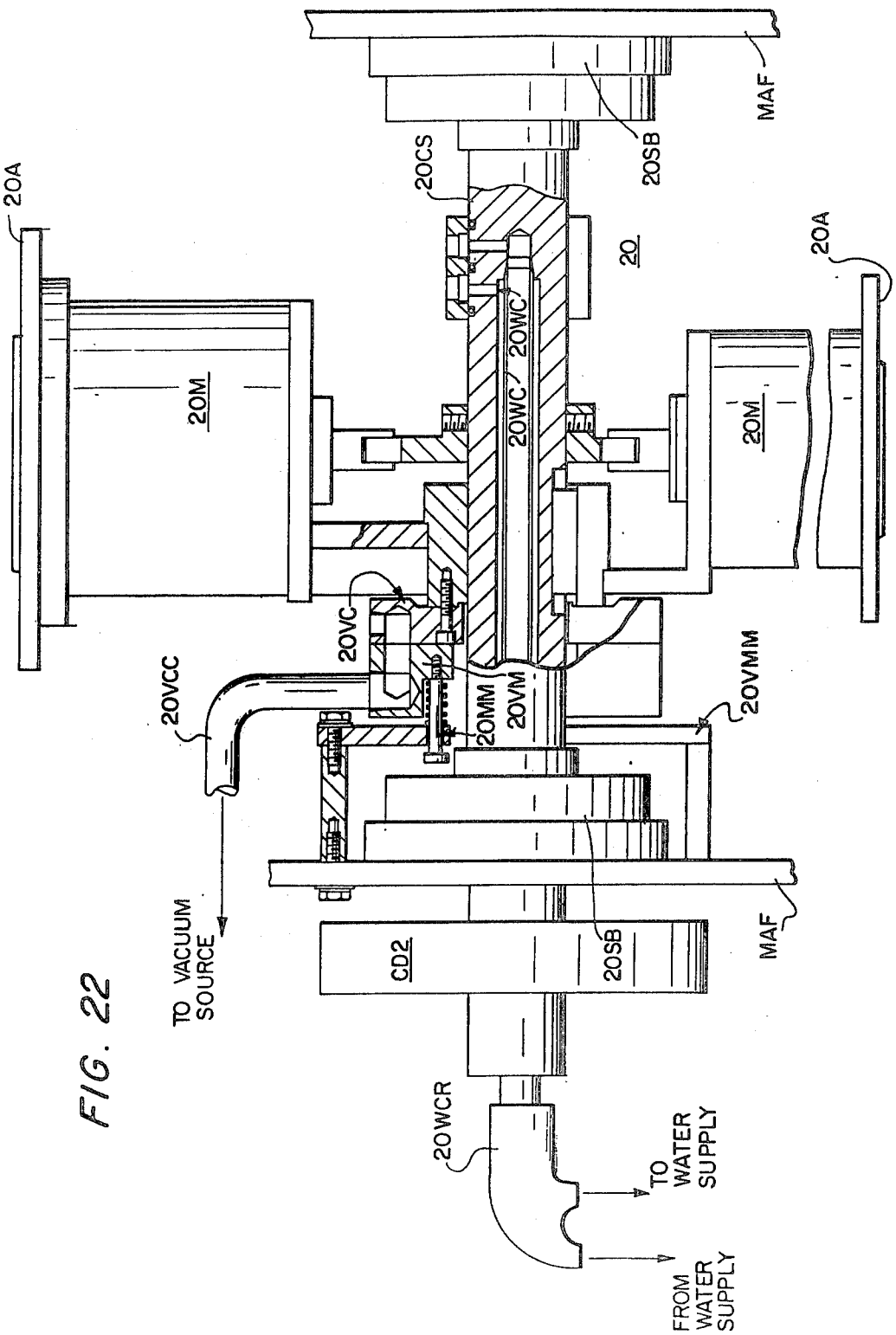
FIG. 22 is a detail of the rotary support shaft, vacuum and cooling system of a mold wheel of the present invention.

Referring additionally to FIG. 22, the internal structure of the mold wheel 20 is illustrated as mounted in the machine frames MAF with a central shaft 20CS provided for rotatably supporting the various molds 20M around the periphery of the mold wheel 20. These mold assemblies 20M may be of the type just described with reference to FIGS. 20 and 21 or those to be described in FIGS. 24 and 25 in connection with the match mold embodiment of the present invention.

The water supply is shown as being provided by central conduits 20WC interally of the shaft 20CS with the conduits being coaxial to provide a circulatory path to the rotary union 20WCR which connects to and from a water supply (not shown). A timing belt pulley CD2, previously described in connection with FIG. 5 is fixed to the center shaft 20CS to rotate the latter in shaft bearings 20SB mounted on the machine frames MAF as illustrated.

Also mounted on the center shaft 20CS is a vacuum commutator coupling 20VC which has a rotary sliding connection with a vacuum manifold 20VM which is in turn connected through suitable conduit means 20VC to vacuum sources or pumps (not shown). Suitable spring-loaded mounting means 20VMM is provided to mount the vacuum manifold 20VM on the machine frame MAF in proximity with the vacuum commutator coupling 20VC.

The Match Mold Embodiment

Figure 23:
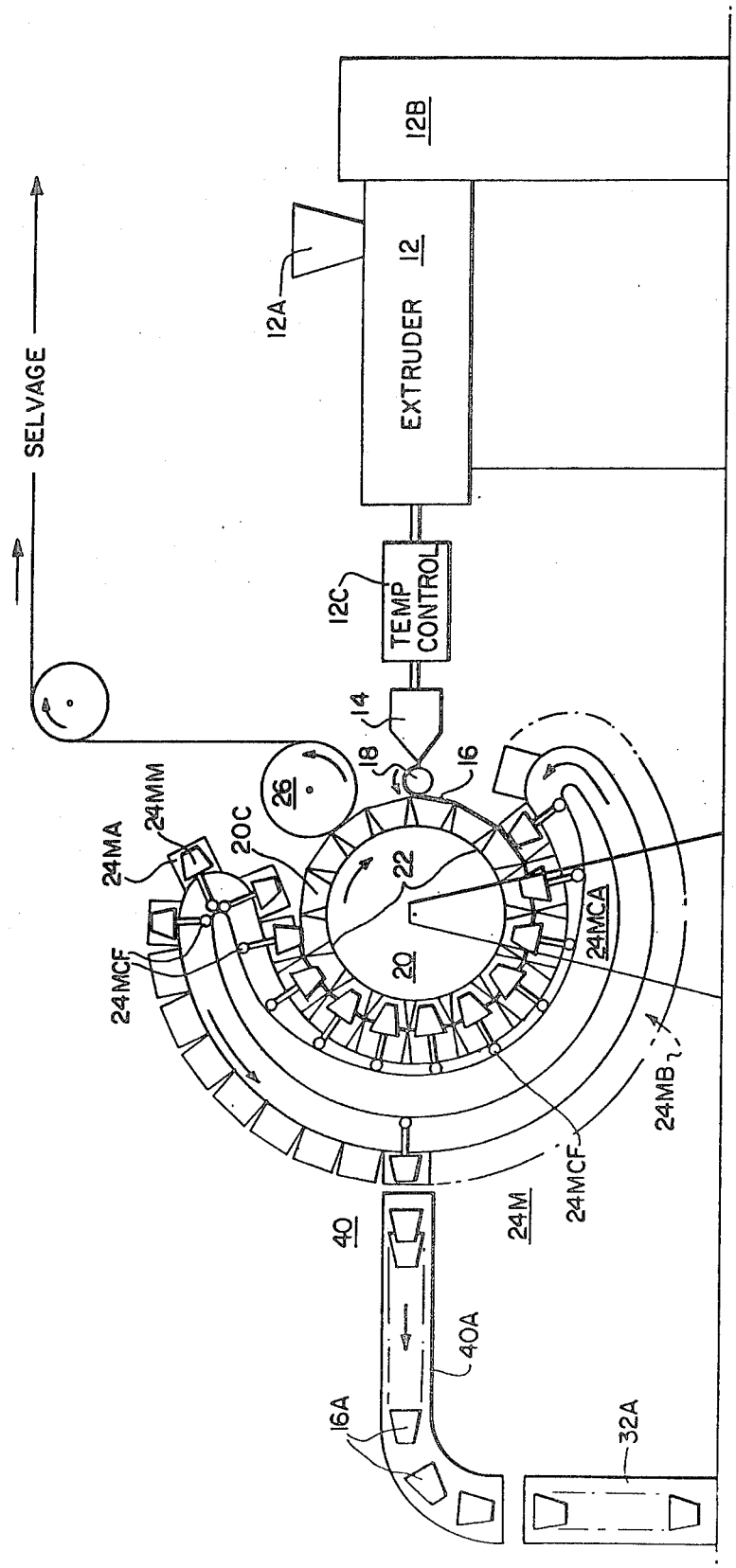
FIG. 23 is a schematic diagram of a match mold type continuous in-line thermoforming system of the present invention.

Referring next to FIGS. 23, 24, and 25, the match mold embodiment 10C of the continuous in-line thermoforming system of the present invention will be described with like portions to the previous embodiments 10, 10A and 10B bearing identical numerals.

Since the match mold embodiment of the continuous inline thermoforming system of the present invention is usually more applicable to foamed extrudates, the web 16 in this embodiment is of foam sheet material and a temperature control 12C in the form of an intermediate cooling or temperature modifying device is placed in line between the die 14 and the extruder 12 to thereby present the extruded foam material to the die 14 at an optimum temperature for the latter to provid a foam web or sheet 16 immediately upstream of a lay-on roll 18 which places the foam sheet material 16 over the die cavities 20C on the mold wheel 20.

Also in the match mold embodiment 10C of the present invention, the arc of contact 22 is much longer for the match mold array 24M to have sufficient time to form, cool and remove product on individual match molds 24M associated with each of a plurality of match molds stations 24MA in a continuous chain configuration 24MB. A suitable crescent shaped cam 24MCA is provided internally of the continuous chain array 24MB defining the match mold array 24M and each match mold plug 24MM is provided with a dependent cam follower 24MCF which rides on the surface of the internal cam 24MCA to control the in and out movement of the match mold plugs 24MM at each of the match mold stations 24MA and associated mold cavity 20C on the mold wheel 20.

Referring to FIGS. 24 and 25, in conjunction with FIG. 23, the mold surface 20A on the mold wheel 20 is provided with an annular cutting knife 20CK surrounding the mold cavity 20C in each of the molds 20M thereon such that a hardened shoulder 24MS on the base of the plate 24FP will abut the sharpened raised cutting edge of the annular cutting knife 20CK when the match mold plug 24MM is in its innermost position in a die cavity 20C, to thereby cut the molded product 16A from the web selvage 16B on the mold wheel 20.

Ejectment from the mold wheel 20 in the embodiment 10C is achieved by the same type of ejection cam 20EC follower 20CF, shaft 20EPS and ejection piston 20EP in the bottom of the mold 20M as has been described in connection with FIGS. 20 and 21. In this instance, however, the product 16A remains on the exterior of the match mold plug 24MM and is carried to a point downstream to an ejection station 40 where the products 16A are air ejected through an air conveyor to 40A to a suitable stacker means 32A positioned downstream therefrom. This ejection is accomplished by suitable air supplies and porting (not shown) on the match mold plug 24MM in a manner known in the art.

It can be seen in FIG. 23, that until the match molds 24MM leave the surface of the mold wheel 20 and reverse their direction back towards the ejection station 40, the resilient sealing anuluss 24SA previously described in conjunction with the mold station 24PA of FIGS. 20 and 21 maintains the web selvage 16B in close engagement with the mold surfaces 20A of the mold wheel 20. Thereafter, the selvage 16B is taken off the mold wheel 20 by the reversing roll 26 and sent back toward a selvage granulator (not shown) to be recycled into the input 12A of the extruder 12.

OPERATION OF THE INVENTION

In each of the embodiments the assist arrays 24, 24P and 24M and their respective chain configurations 24B, 24PB and 24MB are driven by engagement of drive sockets 20DS on each mold face 20A of the mold wheel 20 with corresponding drive pins 24DP on the face plates of each of the assist devices 24A, 24PA and 24MA. Therefore, the drive means which generally synchronize the movement of the assist arrays 24, 24P and 24M with the mold wheel 20 in each of the embodiments 10, 10A, 10B and 10C, respectively, are substantially identical. The specific configurations in the assist devices themselves represent the major differences between these embodiments together with other features such as cutting on the mold face and match molding techniques.

In the operation of the embodiments 10 and 10A of FIGS. 1 and 3, the extrudate in the form of a web 16 of either oriented or non-oriented material is fed onto the surface of the mold wheel 20 and then passes between the mold wheel 20 and pressure assist array 24 such that the sealing disks 24SD of the pressure assist devices 24 are juxtaposed with the mold faces 20A around the mold cavities 20C and pressure is applied to the outer surface of the web 16 through the port 24S1 within the pistons 24S2 to cause positive pressure to assist the vacuum draw from the interior of the mold cavity 20C to draw the web 16 into the mold cavity 20C and provide the finished molded product 16A. Suitable timing is provided as is well known to those of ordinary skill in the art to commence both vacuum and pressure assist at the upstream end of the arc of contact 22 and subsequently remove the pressure assist and vacuum toward the downstream end of the arc of contact 22. Downstream of that arc of contact the finished products are stripped from the mold by the reversing roll 26, carried with the selvage 16B over the registration roller 28 and delivered to the cutting station 30 in proper indexed position with respect thereto such that continuous cutting of finished product 16A and delivery thereof to a stacker is effectuated simultaneously with the return of the web selvage 16B back to a granulating station for recycling into the extruder 12.

This mode of operation similarly applies to the plug assist array 24P in the embodiment 10B of the plug assisted continuous in-line thermoforming system of FIG. 17. The timing diagram of 4 and 8 station mold wheel 20 is illustrated in FIG. 19 to show the various operative positions of the pressure assist plugs 24PP in conjunction with the relationship to the arc of contact 22 between the mold wheel 20 and the plug assist array 24P.

Accordingly, as the plug assist plug 24PP at the upstream end of the arc 22 enters the mold cavity 20C there is a vacuum applied simultaneously to the interior of the mold cavity 20 in the molds 20M as previously described with respect to FIGS. 20 and 21 such that the finished product is assisted in the initial portion of its draw by the plug 24PP which follows it into the bottom of the mold cavity 20C at the same time that vacuum force is being applied to enhance this draw. Then, the cutting knife 24CK on the face plate 24FP and the annular sealing ring 24SA act to both retain the selvage 167B in proper position in the mold face 20A and to cut the finished product 16A from that selvage on the face of the mold wheel 20 in one embodiment or, as illustrated in FIG. 17, to permit the products to remain in the web 16, pass over a registration roll 28 and enter a cutting station 30 in the manner described for the pressure assist embodiments of FIGS. 1 and 3. In either event, selvage 16B is returned to the granulator for recycling to the extruder 12 and the finished products end up in a stacking mechanism or the like for subsequent processing.

A similar operation is provided for the match mold 10C of FIGS. 23 through 25 and indeed, the operation of this embodiment has already been described in conjunction with its description.

If desired the positive pressure assist embodiments can be operated without internal vacuum so long as proper pressure differentials are maintained across the webs 16 at the mouth of each mold cavity into which products 16A are to be formed.

As can be readily seen from the foregoing specification and drawings the present invention has provided a plurality of embodiments of assist arrays and methods adaptable to either shallow or deep draws in a continuous in-line thermoforming system incorporating accurate registration between the assist arrays and the rotating mold wheel such that the finished products can be readily separated and cut from the web selvage either on the mold wheel or downstream thereof with a high degree of accuracy and facility.

It is to be understood that various embodiments shown and described herein are for the sake of example only and are not intended to limit the scope of the appended claims.

What is claimed is:
1. Forming means for continuously thermo-forming molded products from a continuously extruded web of thermoplastic material and utilizing the heat of extrusion to maintain the web in a thermoformable state, comprising:
   extrusion means continuously emitting a heated thermoformable web of thermoplastic material;
   rotary mold wheel means downstream from said extrusion means having a plurality of mold cavities peripherally positioned thereon in a correlated number of peripheral mold faces for receiving said heated thermoformable web on the periphery thereof at a point of ingestion;
   vacuum means in said mold wheel means selectively applying vacuum to the interior of said mold cavities to constrain respective portions of said web to be drawn into said mold cavities to form products conforming to the shape of said mold cavities;
   plural reciprocatable interlinked assist means immediately downstream of said point of ingestion and immediately adjacent and conformally extending over a predetermined arc of registry with the periphery of said mold wheel for applying a constraining force to discrete portions of said web over said mold cavities in conjunction with the action of said vacuum means over substantially the length of said arc of registry to enhance the draw of said web into said mold cavities;
   discharge means for continuously stripping said web and said thermoformed products from said mold wheel;
   separating means for separating said thermoformed products from said web in the provision of web selvage; and
   return means returning said selvage to said extrusion means for recycling.
2. The invention of claim 1, wherein said discharge means comprises:
   reversing roll means for tangentially receiving said web including said thermoformed products integral therewith from the periphery of said mold wheel means; and
   registration roll means receiving said web and integral thermoformed products from said reversing roll means and supplying same to said separating means in a synchronized and indexed manner;
   said separating means including continuous cutting means downstream from said registration roll means and indexed therewith to remove said products from said web and deliver the resulting web selvage to said return means.
3. The invention of claim 1, wherein said separating means comprises cutter means at said peripheral mold faces and responsive to said assist means to sever thermoformed products from said web in the provision of web selvage on said mold wheel means; and
   wherein said discharge means comprises a reversing roll for tangentially receiving said web selvage from the periphery of said mold wheel means and delivering said selvage to said return means; and
   ejection means for ejecting said severed products from said mold cavities downstream of said arc of registry with said assist means.
4. The invention of claims 1, 2, or 3 wherein said forming means further includes orienting means intermediate said extrusion means and said mold wheel means for imparting orientation to said heated thermoformable web along selected axes thereof.

5. The invention of claims 1, 2, or 3 wherein said thermoformable heated web is a thermoplastic foam material; and
   wherein said forming extrusion means further includes:
   die means delivering a heated foam web to said mold wheel means;
   a main extrusion means providing and feeding foam extrudate to said die means; and
   an extrudate temperature control means intermediate said die means and said main extrusion means.

6. The invention of claims 1, 2 or 3 wherein said assist means further comprises:
   a plurality of assist station means for cooperating with said mold cavities interconnected in an endless loop array adjacent said mold wheel means;
   drive means interconnecting said mold wheel means and said assist station means for indexing said assist station means into respective registry with successive mold cavities in said mold wheel means; and
   control means constraining said assist station means to impart said constraining force to said web over the said predetermined arc of registry between each said assist station means and a corresponding said mold cavity.

7. The invention of claims 1, 2 or 3 wherein said assist means further comprises:
   a plurality of assist station means for cooperating with said mold cavities interconnected in an endless loop array adjacent said mold wheel means;
   drive means interconnecting said mold wheel means and said assist station means for indexing said assist station means into respective registry with successive mold cavities in said mold wheel means; and
   control means constraining said assist station means to impart said constraining force to said web over the said predetermined arc of registry between each said assist station means and a corresponding said mold cavity; and
   wherein said assist station means comprises pressure means, responsive to said control means, for applying a positive pressure to said web, in conjunction with said vacuum means, over a surface area of said web at least as large as and in registry with a said mold cavity in registry with said assist station means.

8. The invention of claims 1, 2 or 3 wherein said assist means further comprises:
   a plurality of assist station means for cooperating with said mold cavities interconnected in an endless loop array adjacent said mold wheel means;
   drive means interconnecting said mold wheel means and said assist station means for indexing said assist station means into respective registry with successive mold cavities in said mold wheel means; and
   control means constraining said assist station means to impart said constraining force to said web over the said predetermined arc of registry between each said assist station means and a corresponding said mold cavity; and wherein said assist station means comprises reciprocable plug means, in insertable into said mold cavities through said web, responsive to said control means, and acting in conjunction with said vacuum means for forcing said web into a said mold cavity in registry with said assist station means.

9. The invention of claims 1, 2 or 3 wherein said assist means further comprises:
   a plurality of assist station means for cooperating with said mold cavities interconnected in an endless loop array adjacent said mold wheel means;
   drive means interconnecting said mold wheel means and said assist station means for indexing said assist station means into respective registry with successive mold cavities in said mold wheel means; and
   control means constraining said assist station means to impart said constraining force to said web over the said predetermined arc of registry between each said assist station means and a corresponding said mold cavity; and
   wherein said assist station means comprises:
   reciprocable match mold means insertable into said mold cavities through said web to form products thereon in conjunction with the draw of said web by said vacuum means, and
   web severing means associated with said mold wheel and said match mold means to sever the said products formed thereon from said web to permit removal of said products from said mold cavities on said match old means.

10. The invention of claims 1, 2 or 3 wherein said assist means further comprises:
    a plurality of assist station means for cooperating with said mold cavities interconnected in an endless loop array adjacent said mold wheel means;
    drive means interconnecting said mold wheel means and said assist station means for indexing said assist station means into respective registry with successive mold cavities in said mold wheel means; and
    control means constraining said assist station means to impart said constraining force to said web over the said predetermined arc of registry between each said assist station means and a corresponding said mold cavity; and
    wherein said assist station means comprises pressure means, responsive to said control means, for applying a positive pressure to said web, in conjunction with said vacuum means, over a surface area of said web at least as large as and in registry with a said mold cavity in registry with said assist station means; and further,
    wherein said control means comprises selective means for activating said pressure means to apply said positive pressure to said web over said predetermined arc of registry.

11. The invention of claims 1, 2 or 3 wherein said assist means further comprises:
    a plurality of assist station means for cooperating with said mold cavities interconnected in an endless loop array adjacent said mold wheel means;
    drive means interconnecting said mold wheel means and said assist station means for indexing said assist station means into respective registry with successive mold cavities in said mold wheel means; and
    control means constraining said assist station means to impart said constraining force to said web over the said predetermined arc of registry between each said assist station means and a corresponding said mold cavity; and
    wherein said assist station means comprises:
    reciprocable match mold means insertable into said mold cavities through said web to form products thereon in conjunction with the draw of said web by said vacuum means, and web severing means associated with said mold wheel and said match mold means to sever the said products formed thereon from said web to permit removal of said products from said mold cavities on said match mold means; and further, wherein said control means comprises:

cam means shaped to constrain said plug means to enter and retract from said mold cavities; and cam follower means connected with said plug means for engageably tracking said cam means.

12. The invention of claims 1, 2 or 3 wherein said assist means further comprises:

a plurality of assist station means for cooperating with said mold cavities interconnected in an endless loop array adjacent said mold wheel means;

drive means interconnecting said mold wheel means and said assist station means for indexing said assist station assist station means into respective registry with successive mold cavities in said mold wheel means; and control means constraining said assist station means to impart said constraining force to said web over the said predetermined arc of registry between each said assist station means and a corresponding said mold cavity; and wherein said assist station means comprises:

reciprocable match mold means insertable into said mold cavities through said web to form products thereon in conjunction with the draw of said web by said vacuum means, and web severing means associated with said mold wheel and said match mold means to sever the said products formed thereon from said web to permit removal of said products from said mold cavities on said match mold means; and further, wherein said control means comprises:

cam means shaped to constrain said plug means to enter and retract from said mold cavities; and cam follower means connected with said match mold means to said cam means.

13. In a continuous, in-line thermo-forming system providing thermo-formed products from a continuously extruded web of thermoplastic material and including a rotary mold wheel means having a plurality of mold cavities peripherally positioned thereon in a correlated number of peripheral mold faces over which said web is received;

assist means to effectuate a draw of said thermoplastic material into said mold cavities, comprising:

a plurality of reciprocatable assist station means for cooperating with said mold cavities interconnected in an endless loop array adjacent said mold wheel means;

drive means interconnecting said mold wheel means and said assist station means for indexing said assist station means into respective registry with successive mold cavities in said mold wheel means; and control means constraining said assist station means to impart a draw assisting force to said web at each of said mold cavities over a predetermined arc of registry between each said assist station means and a corresponding said mold cavity.

14. In a continuous, in-line thermo-forming system providing thermo-formed products from a continuously extruded web of thermoplastic material and including a rotary mold wheel means having a plurality of mold cavities peripherally positioned thereon in a correlated number of peripheral mold faces over which said web is received, and vacuum means associated with said mold wheel for vacuum drawing said thermoplastic material of said web into said mold cavities;

assist means for assisting said vacuum means to effectuate a draw of said thermoplastic material into said mold cavities, comprising:

a plurality of reciprocatable assist station means for cooperating with said mold cavities interconnected in an endless loop array adjacent said mold wheel means;

drive means interconnecting said mold wheel means and said assist station means for indexing said assist station means into respective registry with successive mold cavities in said mold wheel means; and control means constraining said assist station means to impart a draw assisting force to said web at each of said mold cavities over a predetermined arc of registry between each said assist station means and a corresponding said mold cavity.

15. The invention of claim 14, wherein said assist station means comprises pressure means, responsive to said control means, for applying a positive pressure to said web, in conjunction with said vacuum means, over a surface area of said web at least as large as and in registry with a said mold cavity in registry with said assist station means.

16. The invention of claim 15, wherein said control means comprises selective means for interconecting said pressure means with a pressure source over said predetermined arc of registry.

17. The invention of claim 14, wherein said assist station means comprises:

reciprocable match mold means insertable into said mold cavities through said web to form products thereon in conjunction with the draw of said web by said vacuum means, and web severing means associated with said mold wheel and said match mold means to sever the said products formed thereon from said web to permit removal of said products from said mold cavities on said match mold means.

18. The invention of claim 17, wherein said control means comprises cam means shaped to constrain said plug means to enter and retract from said mold cavities; and cam follower means connected with said match mold means for engageably tracking said cam means.

19. The invention of claim 14, wherein said assist station means comprises reciprocable plug means, insertable into said mold cavities through said web, responsive to said control means, and acting in conjunction with said vacuum means for forcing said web into a said mold cavity in registry with said assist station means.

20. The invention of claim 19 wherein said control means comprises cam means shaped to constrain said plug means to enter and retract from said mold cavities; and cam follower means connected with said plug means for engageably tracking said cam means.

21. The invention of claim 19, wherein said assist station further includes cutter means responsive to the insertion of said plug means into a said mold cavity to sever a mold product from said web and permit said product to remain in said cavity after withdrawal from the latter of said plug means.

22. The invention of claim 21, wherein said control means comprises cam means shaped to constrain said plug means to enter and retract from said mold cavities; and wherein said cam means further includes biasing means constraining said cam follower means and said plug means to activate said cutter means at a predetermined point in said arc of registry.

23. The invention of either of claims 14 through 22, wherein said endless loop array is substantially conformally configured with the periphery of said mold wheel over at least the said predetermined arc of registry therewith.

* * * * *